March 6, 1956  F. J. ROUAN ET AL  2,736,999

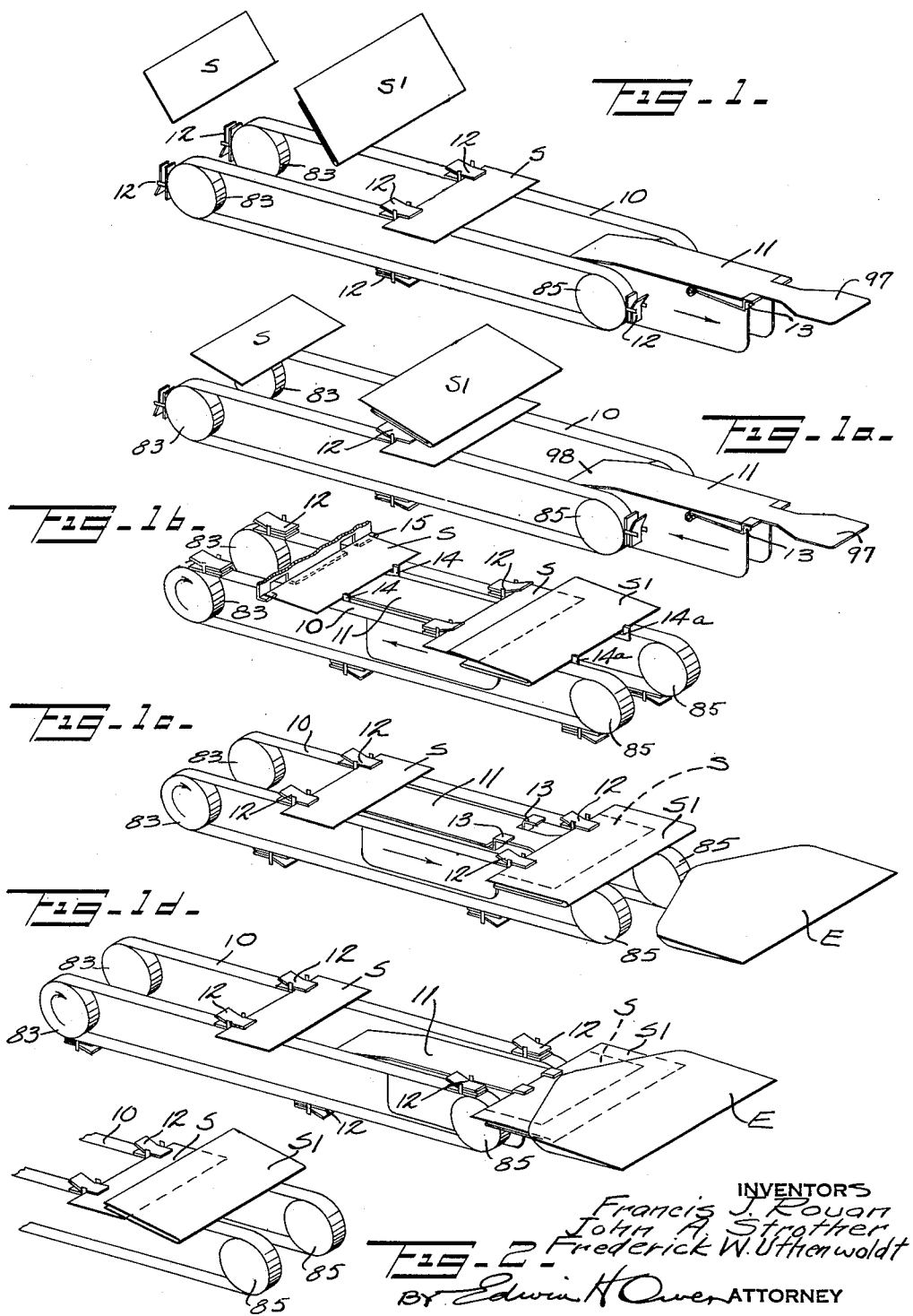

ENVELOPE STUFFING MACHINE

Filed May 25, 1950  17 Sheets-Sheet 2

INVENTORS
Francis J. Rouan
John A. Strother
Frederick W. Uthenwoldt

BY Edwin H. Ower ATTORNEY

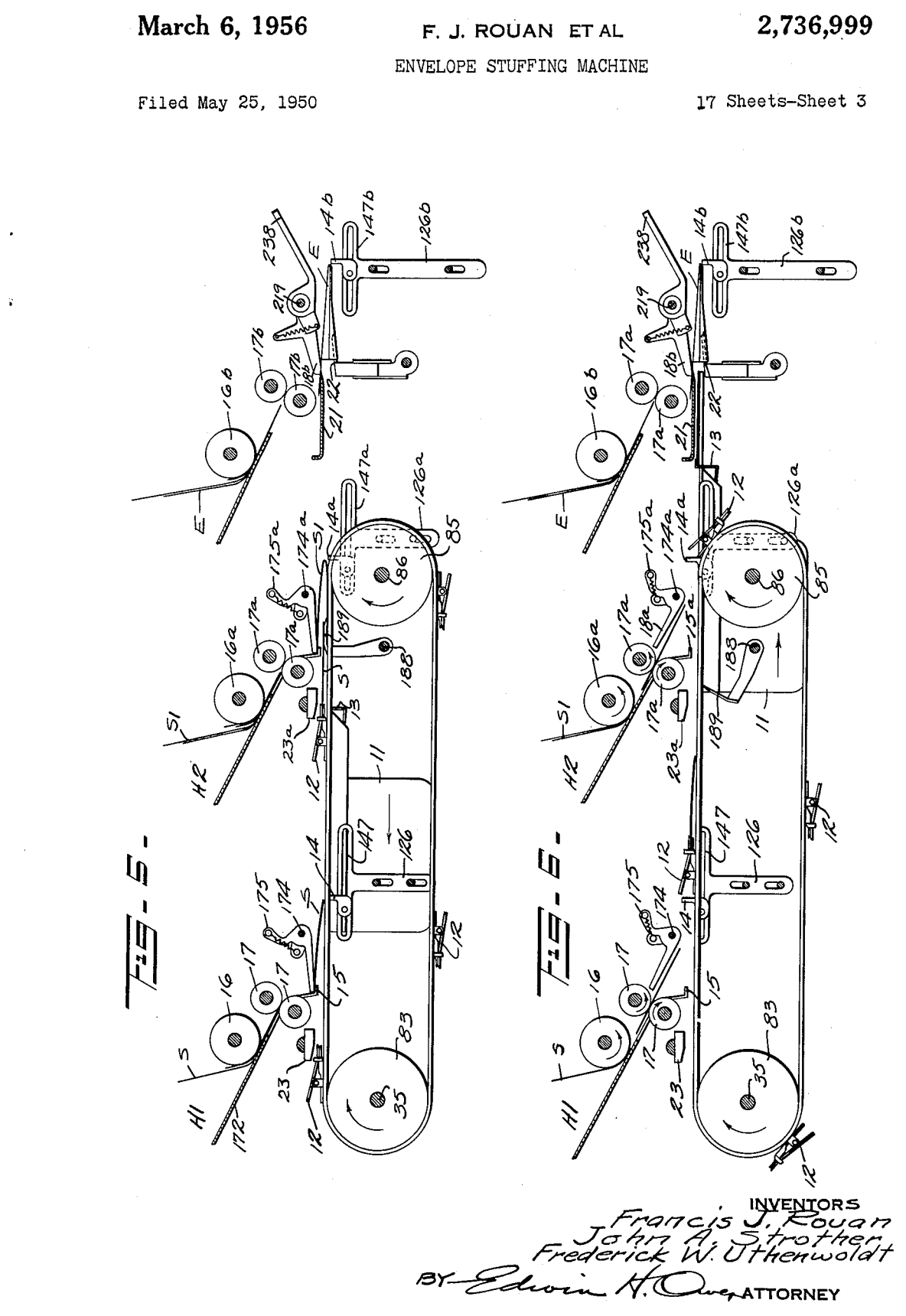

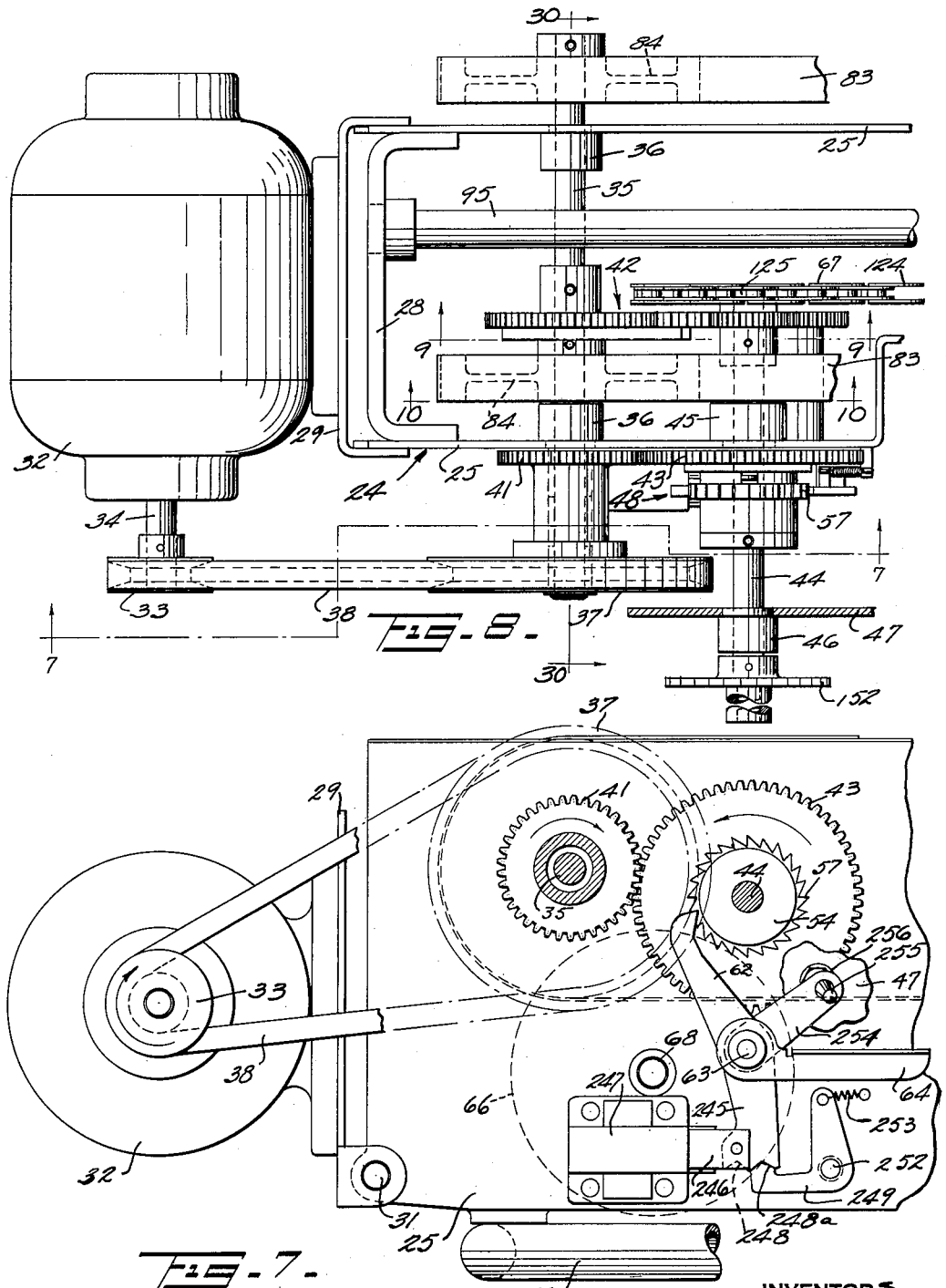

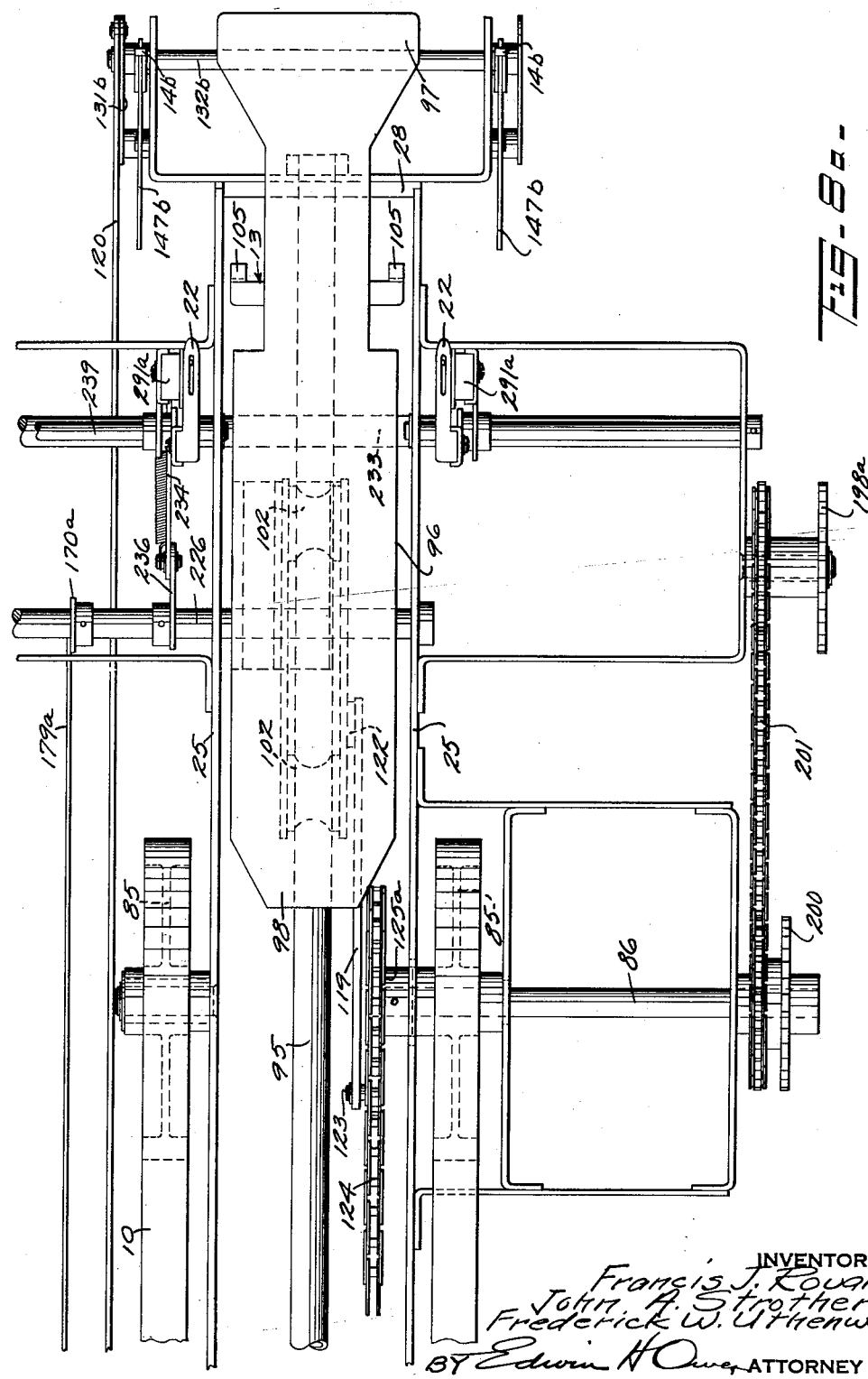

March 6, 1956
F. J. ROUAN ET AL
2,736,999
ENVELOPE STUFFING MACHINE
Filed May 25, 1950
17 Sheets-Sheet 6
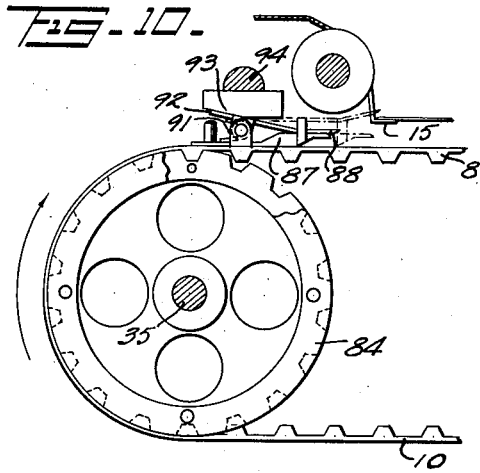
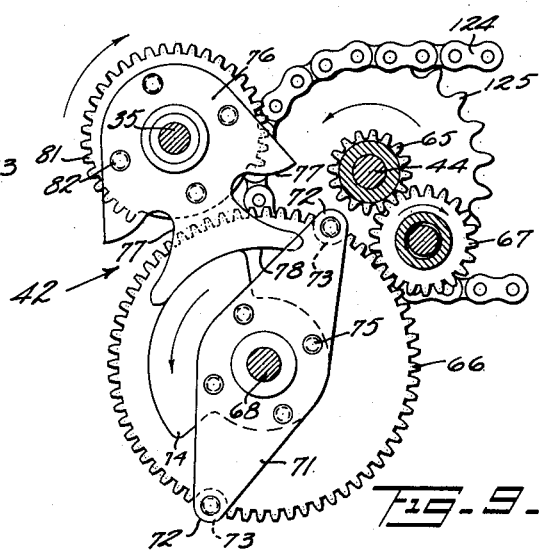
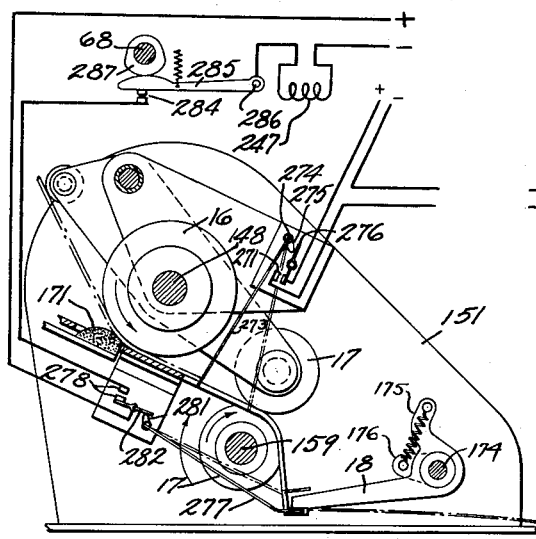
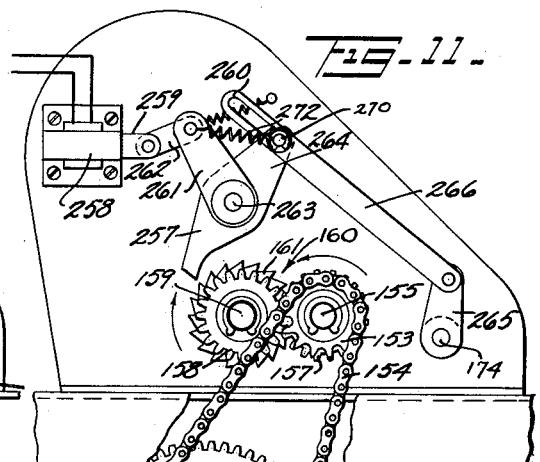
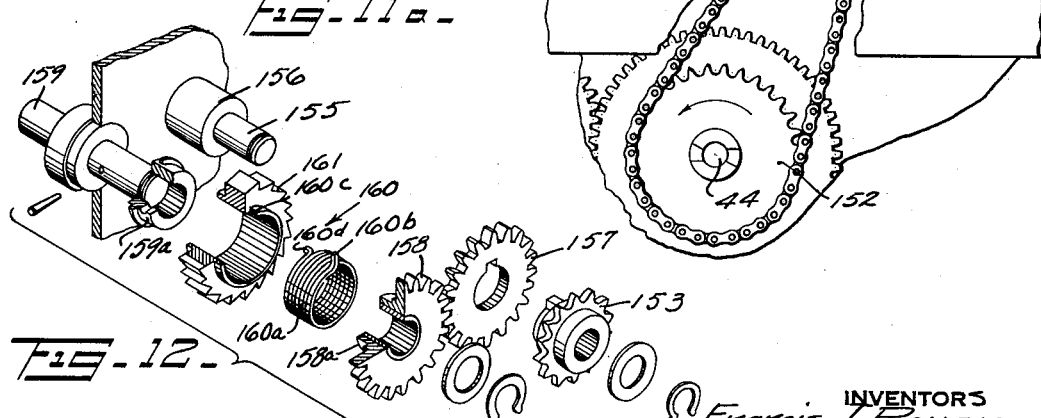
INVENTORS
Francis J. Rouan
John H. Strother
Frederick W. Uthenwoldt
BY Edwin N. Owen ATTORNEY

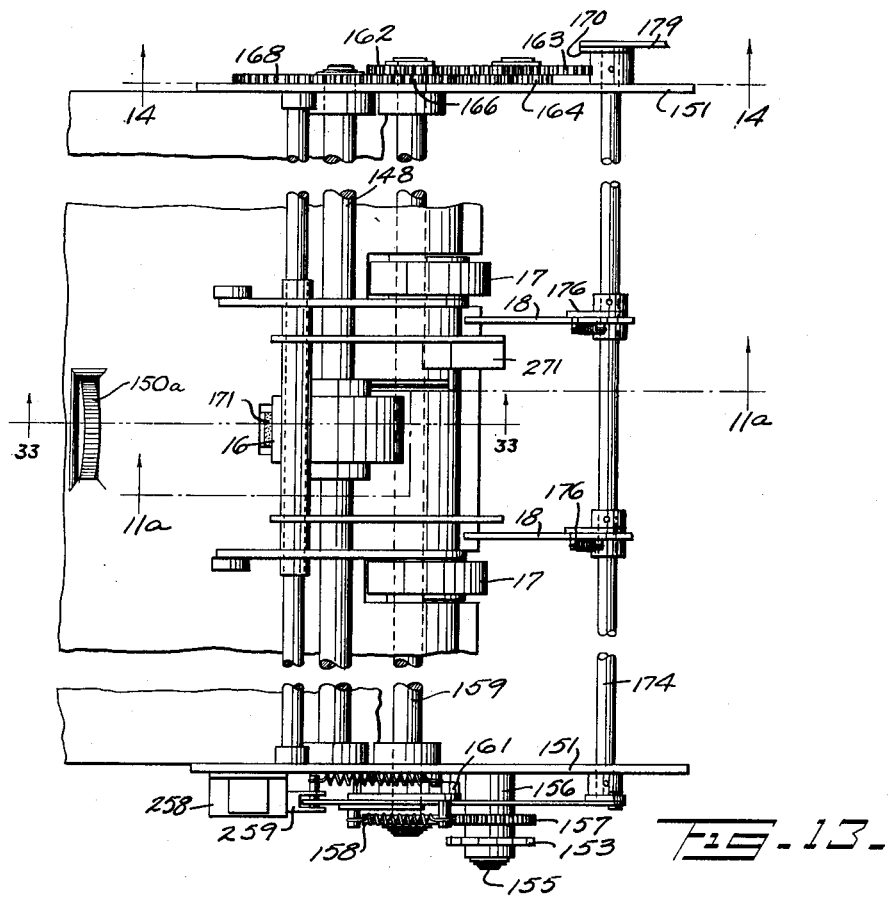
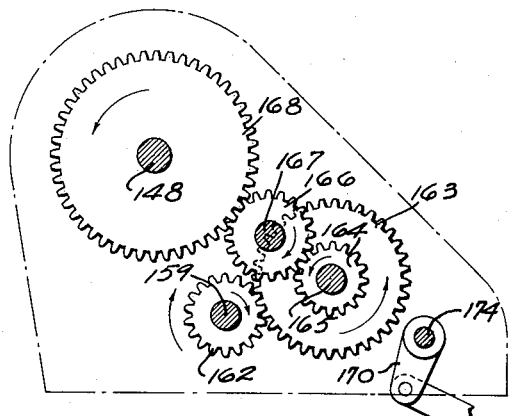

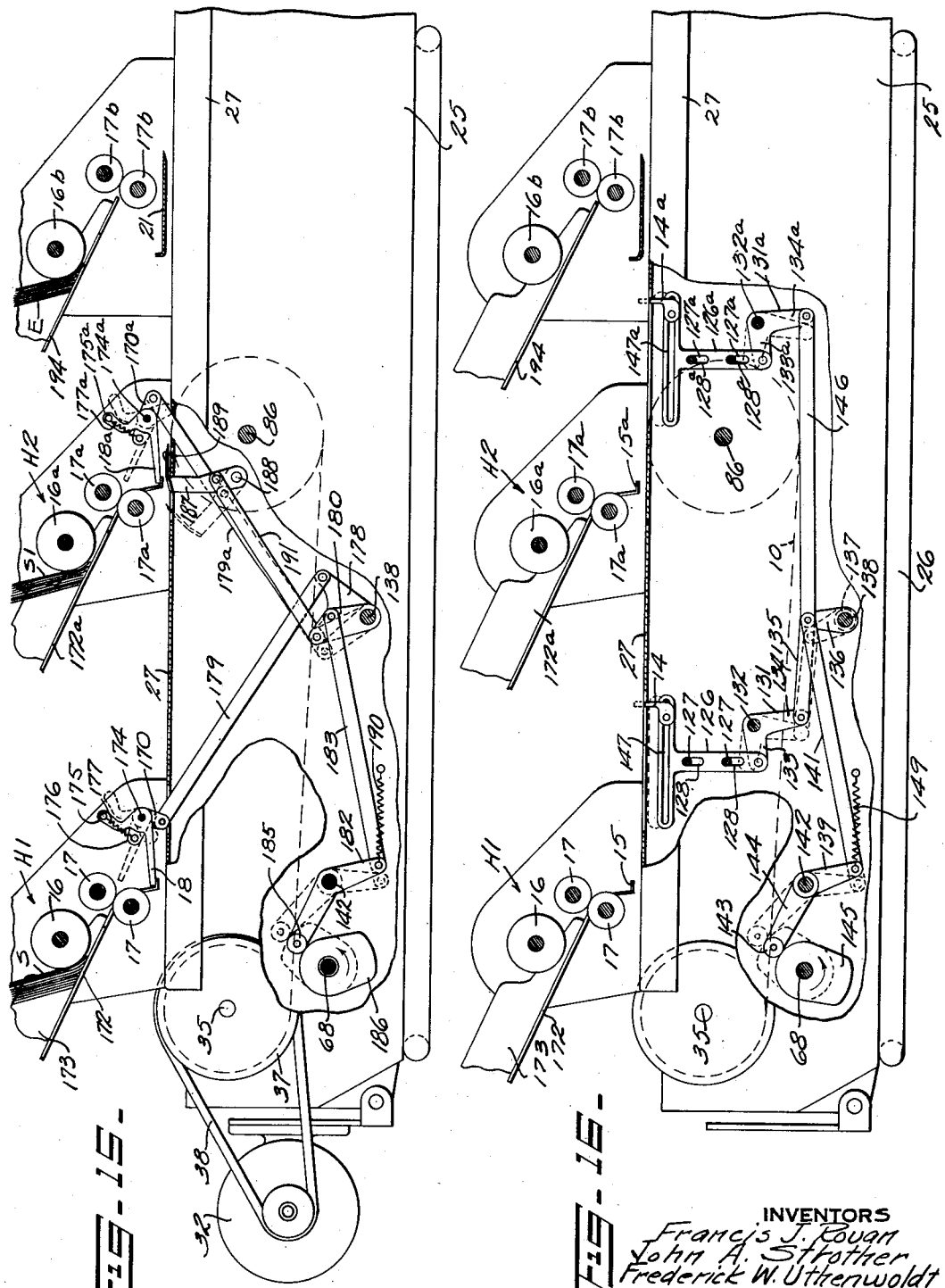

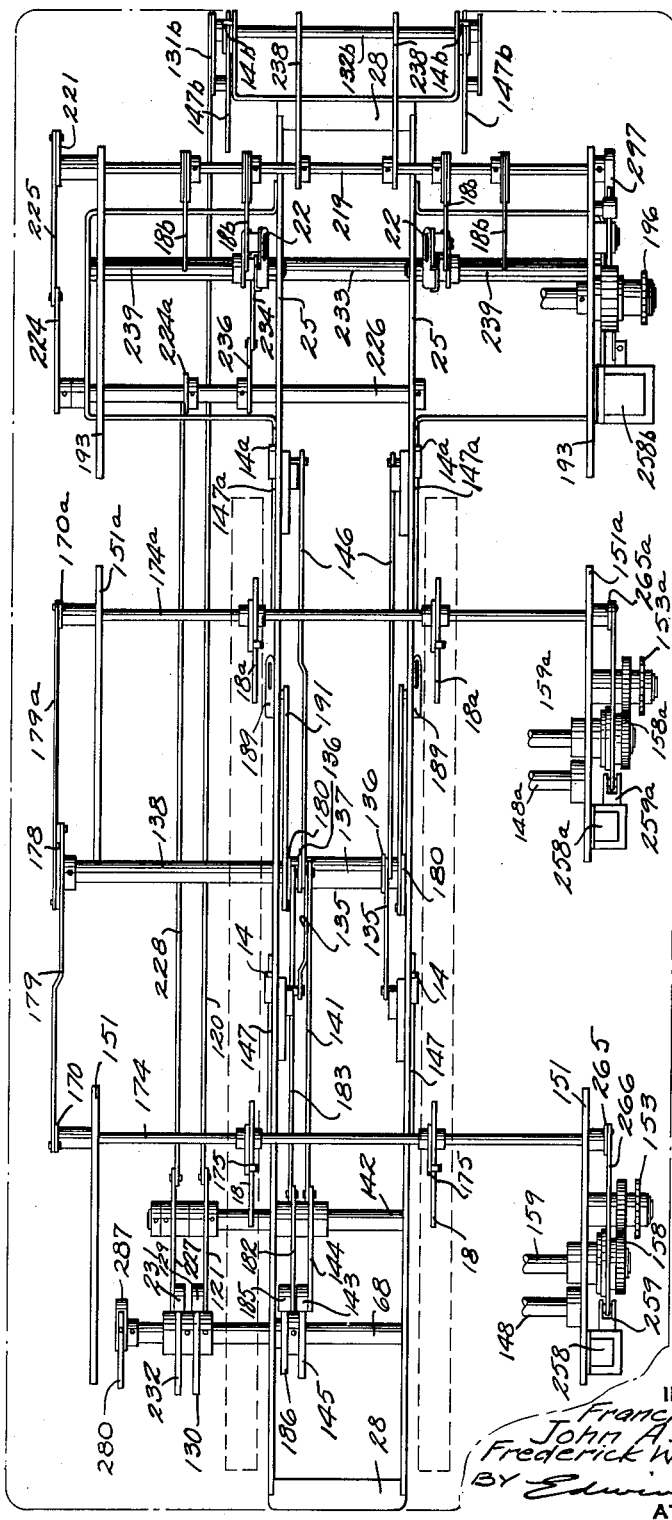

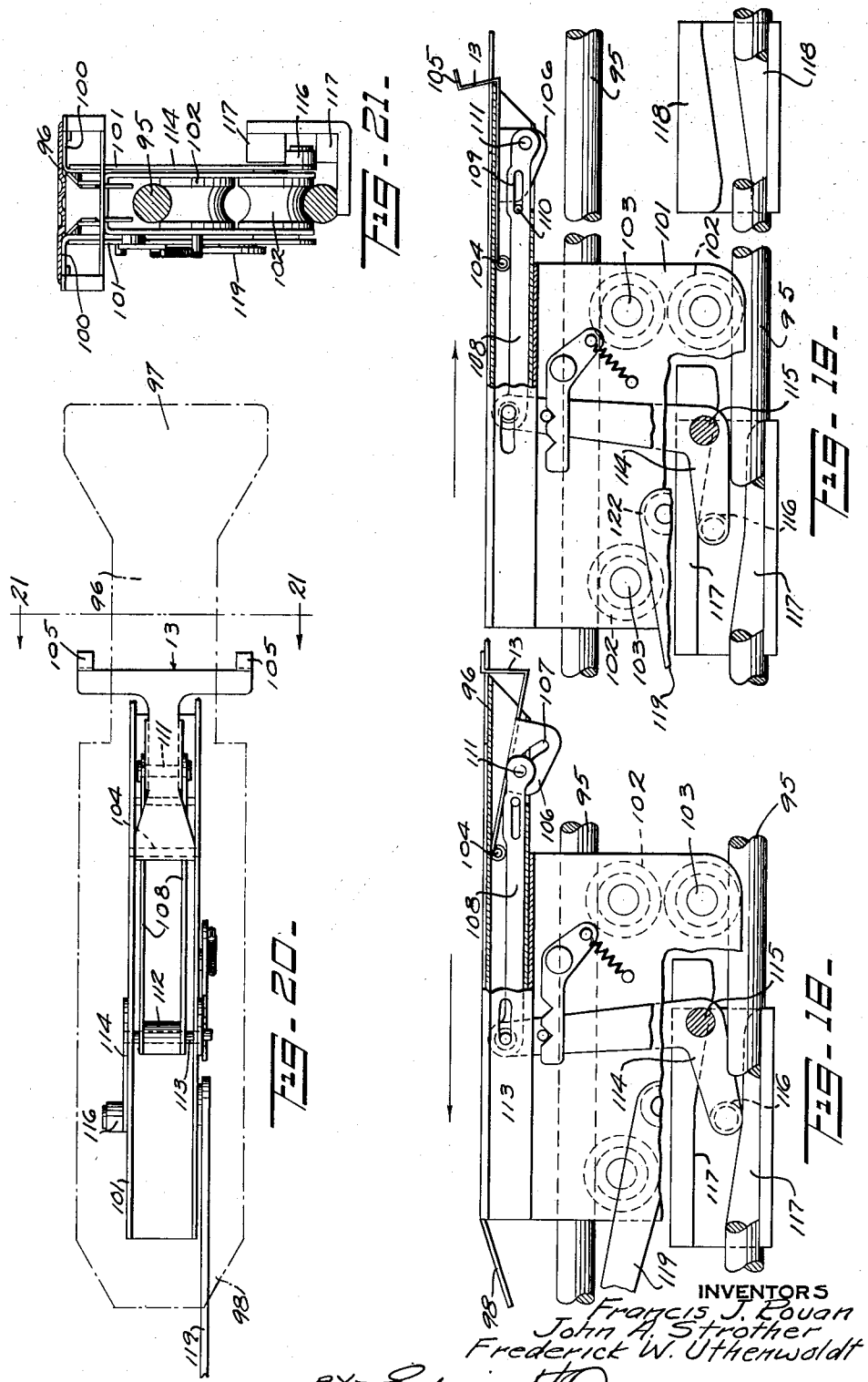

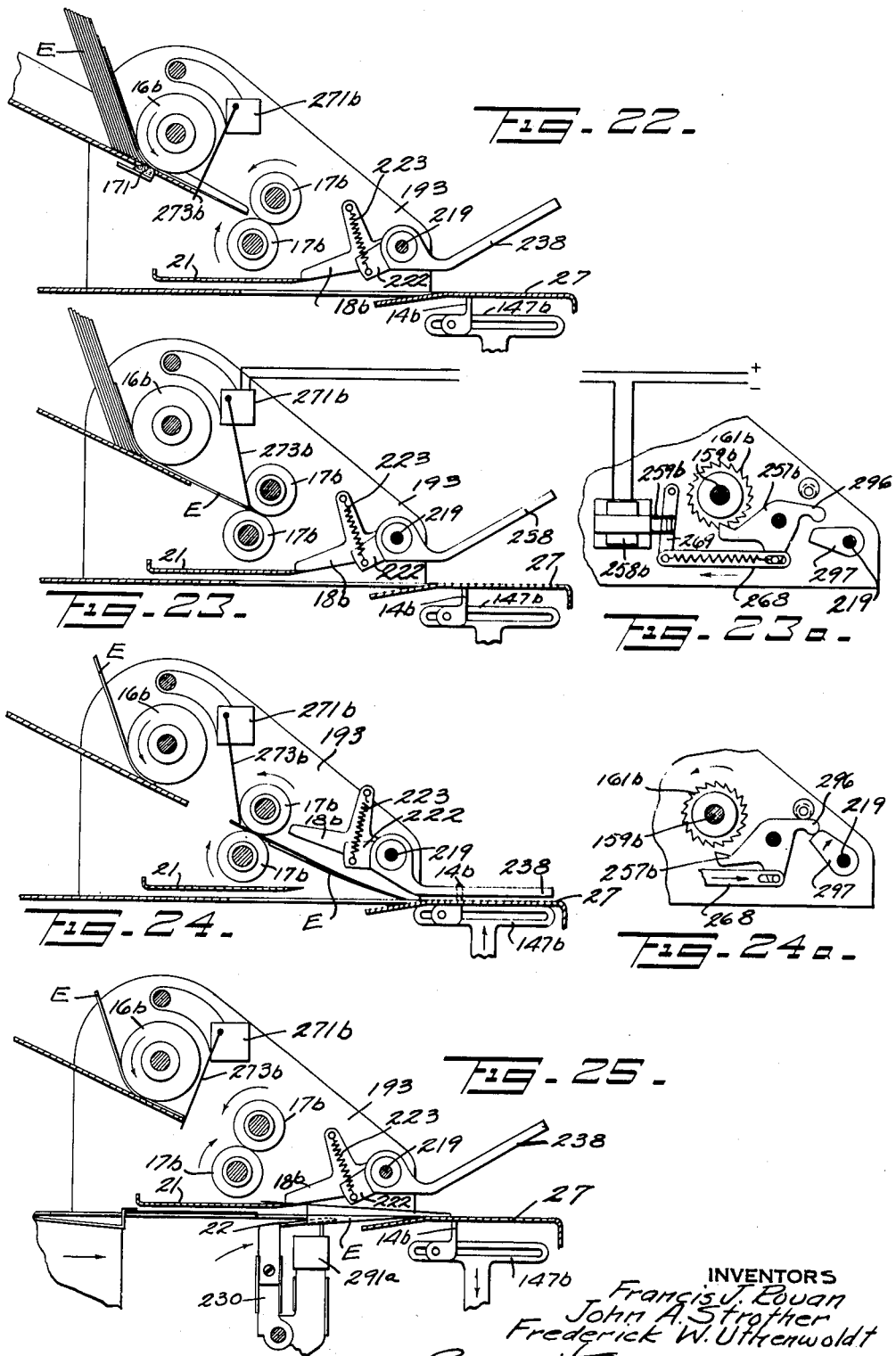

March 6, 1956  F. J. ROUAN ET AL  2,736,999

ENVELOPE STUFFING MACHINE

Filed May 25, 1950  17 Sheets-Sheet 12

INVENTORS
Francis J. Rouan
John A. Strother
Frederick W. Utherwoldt

BY Edwin H Over ATTORNEY

March 6, 1956   F. J. ROUAN ET AL   2,736,999
ENVELOPE STUFFING MACHINE
Filed May 25, 1950   17 Sheets-Sheet 13
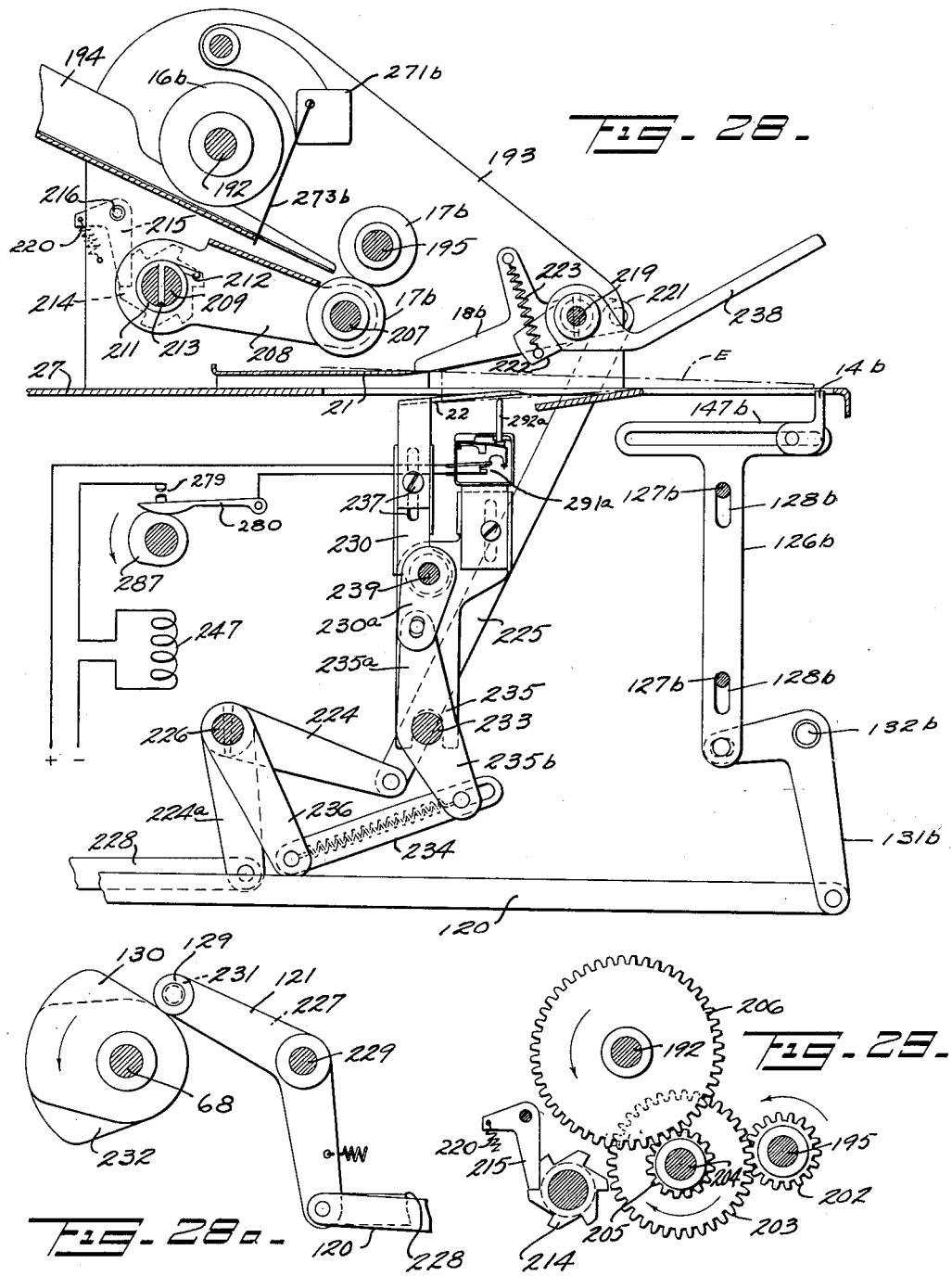
INVENTORS
Francis J. Rouan
John A. Strother
Frederick W. Uthenwoldt
BY Edwin H. Ours ATTORNEY

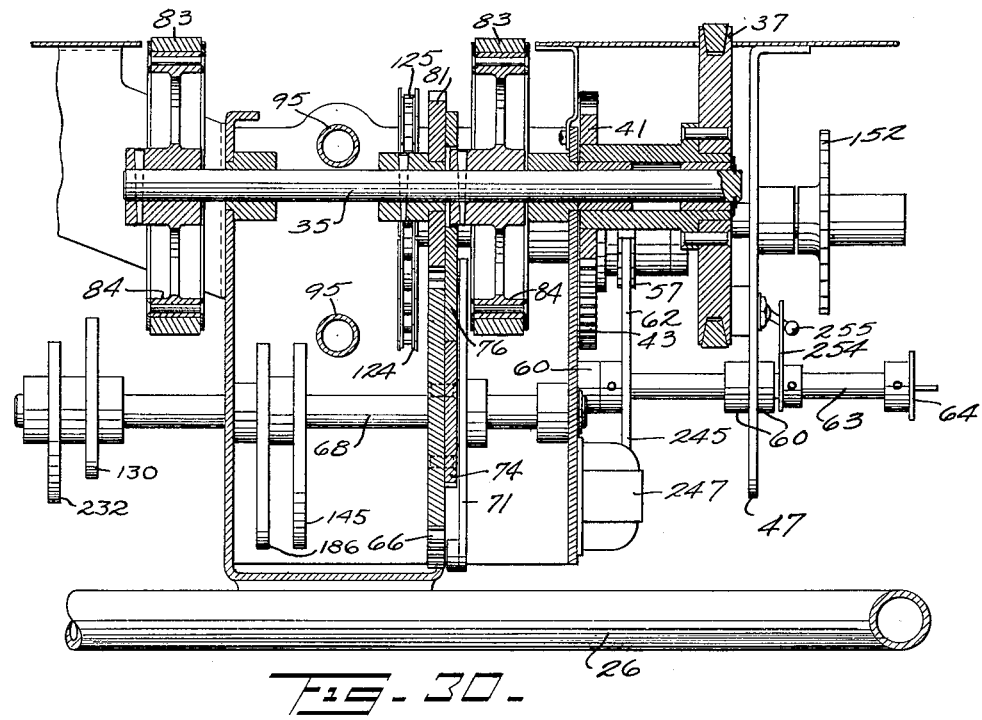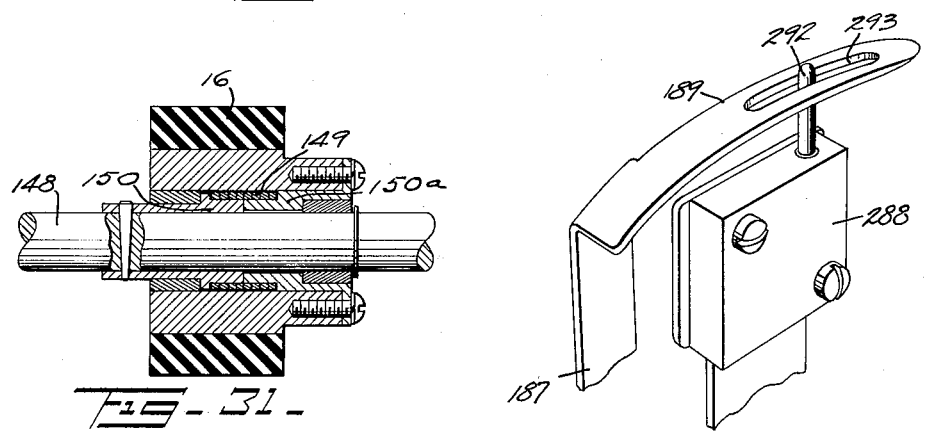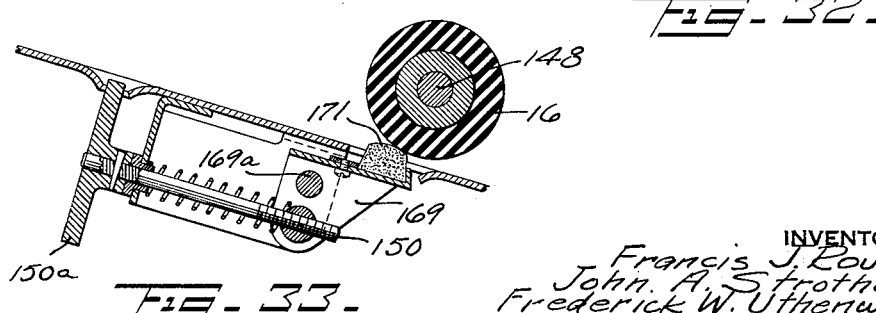

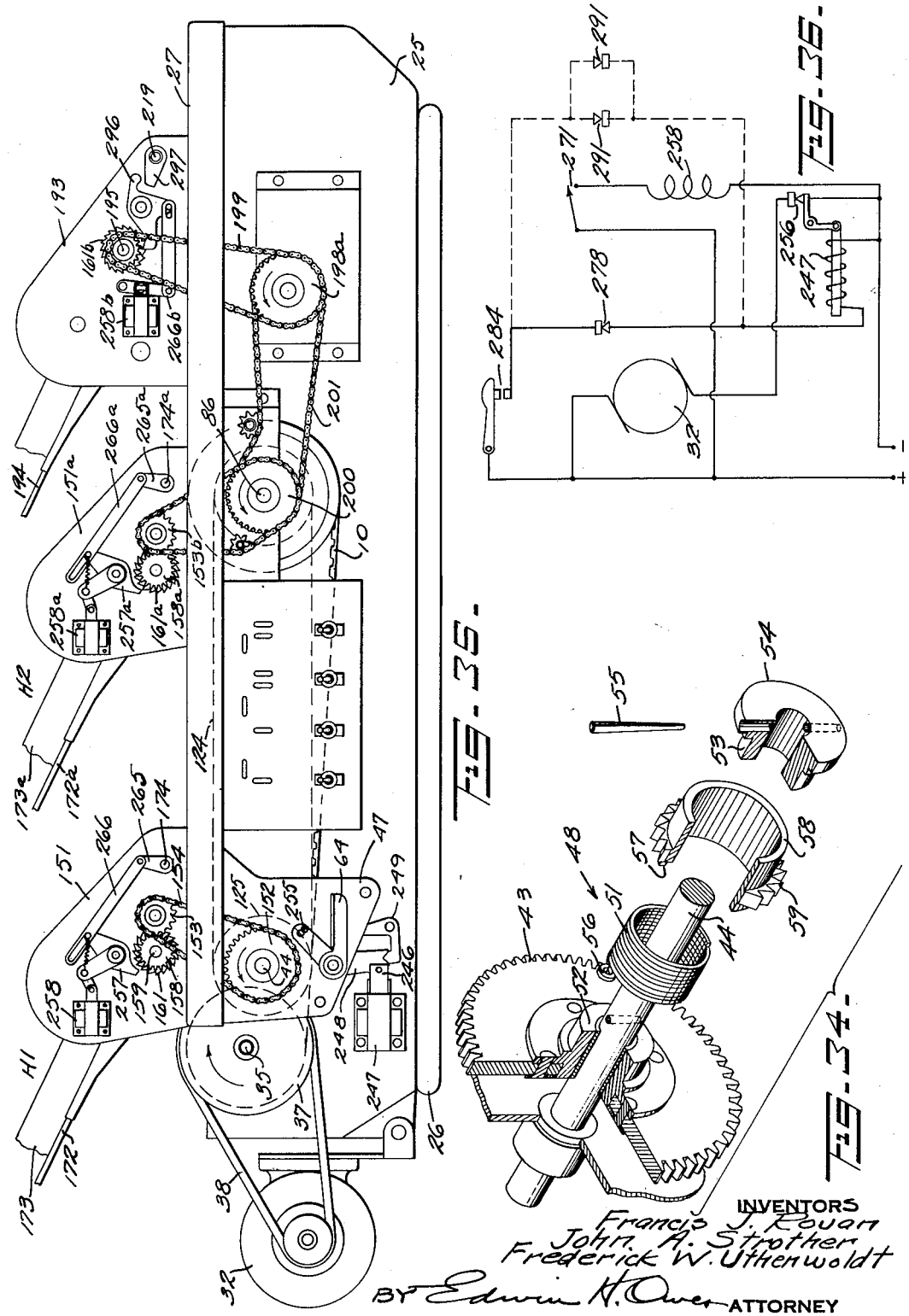

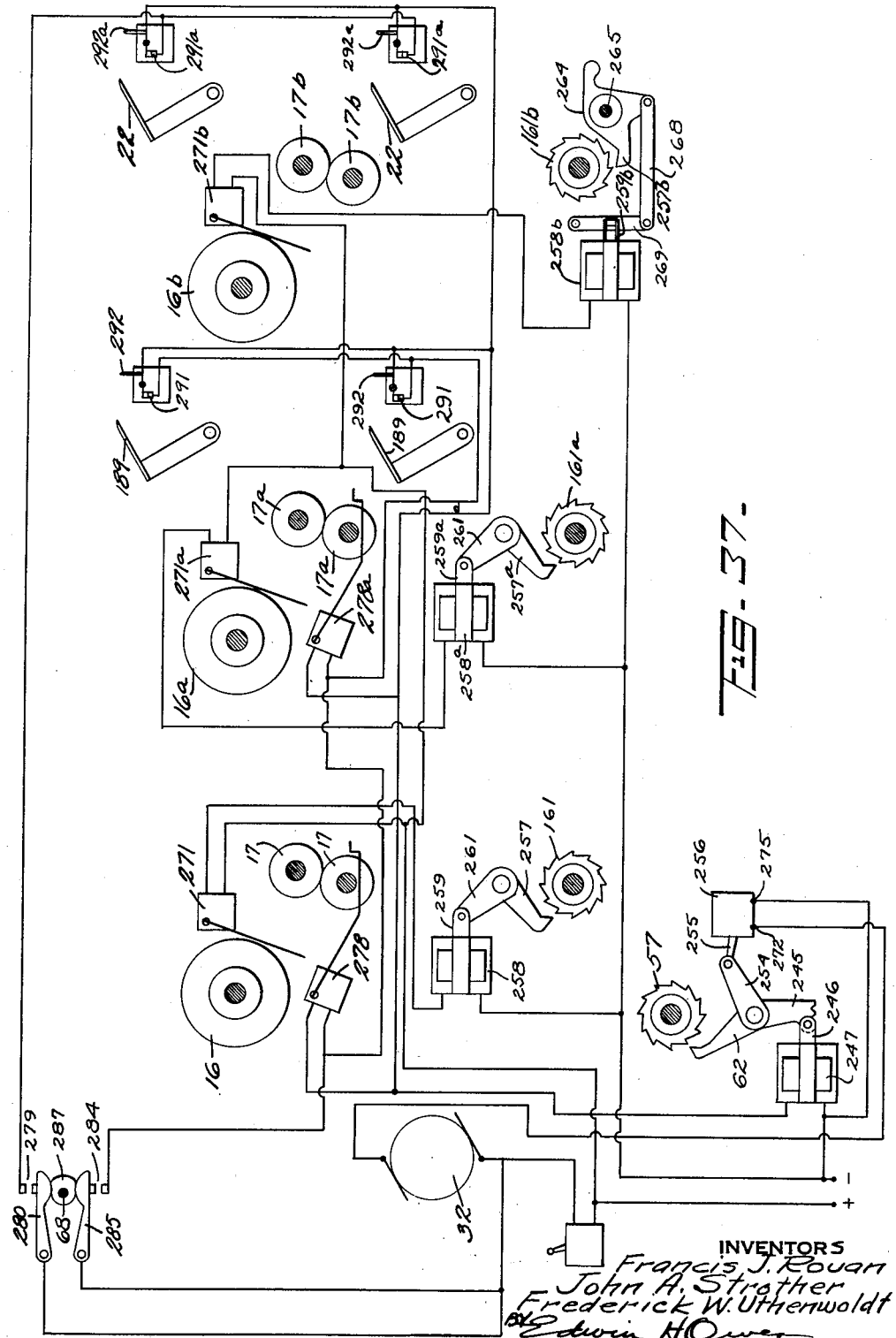

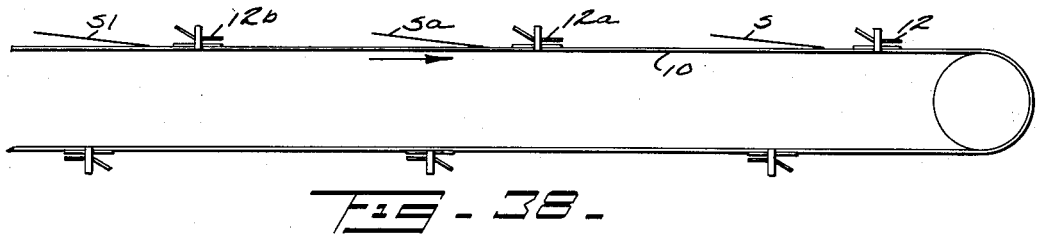
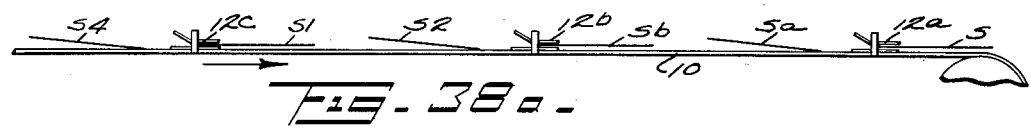
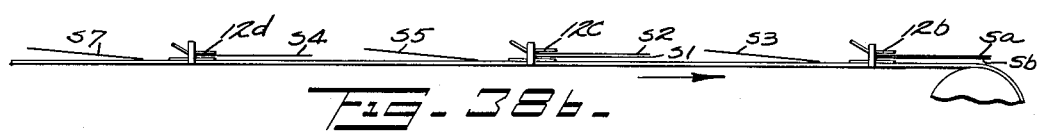
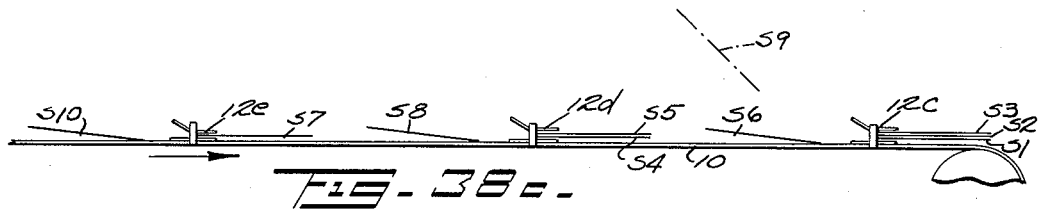
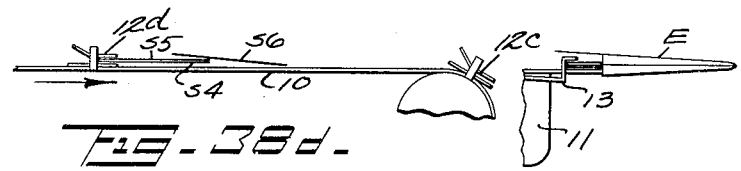

United States Patent Office 2,736,999
Patented Mar. 6, 1956

2,736,999

ENVELOPE STUFFING MACHINE

Francis J. Rouan, Darien, John A. Strother, Stamford, and Frederick W. Uthenwoldt, Glenbrook, Conn., assignors to Pitney-Bowes, Inc., Stamford, Conn., a corporation of Delaware Application May 25, 1950, Serial No. 164,182

12 Claims. (Cl. 53—29)

This invention relates to a machine for assembling pieces of mailing material and inserting or stuffing said assembled pieces in an envelope.

It is one object of the invention to provide a machine for assembling pieces of mailing material preparatory to stuffing said material within an envelope by feeding single pieces of material from each of a plurality of hoppers and depositing said pieces in the path of an intermittently movable conveyor in such manner that each piece deposited will have its trailing edge positioned above the leading edge thereof, then conveying said deposited pieces to positions intermediate said deposit positions during the first intermittent movement of the conveyor, while single pieces from said hoppers are again fed and deposited in the conveyor path with their trailing edges positioned above the leading edges thereof, then assembling the pieces deposited during the next intermittent movement of the conveyor by conveying the intermediate positioned pieces beneath the raised trailing edges of the pieces last deposited, which process will be continuous to assemble as many pieces of material as there are hoppers with pieces therein.

It is another object to provide for the assembly of pieces of material in either a superimposed or a nested order, or in a combination of a superimposed and nested order.

It is also an object to provide a reciprocating ram at the discharge end of the conveyor for the purpose of overtaking the assembled pieces during their final step of conveyance by the conveyor and to move said assembled pieces from the conveyor into the open mouth of the envelope.

It is a further object to include electrically controlled means whereby each cycle of machine operation will continue only when the pieces and envelope are in proper position and condition for assembling and inserting.

It is also an object to perform all the operations of piece stripping, feeding, conveying, assembling and inserting with the pieces moving in one direction.

In the drawings:

Figs. 1, 1a, 1b, 1c and 1d are diagrammatic perspective views showing the general principle of operation in feeding, conveying and assembling pieces of mail matter, with 1d showing the final operation of inserting the pieces in an open mouthed envelope;

Fig. 2 is a further operational view showing the assembly of one piece beneath another;

Figs. 3, 4, 5 and 6 are side elevational views showing the actual mechanical performance of the operations disclosed in Figs. 1, 1a, 1b, 1c, 1d, but without resorting to the operating mechanism;

Fig. 7 is a side elevational view of the power drive end of the machine;

Fig. 8 is a plan view of Fig. 7;

Fig. 8a is continuation plan view of Fig. 8;

Fig. 9 is a vertical sectional view taken along the line 9—9 of Fig. 8 and showing the intermittent drive control mechanism for the conveyor;

Fig. 10 is a vertical sectional view taken along the line 10—10 of Fig. 8, and showing a means for opening the gripper members prior to gripping and conveying a piece fed from a hopper;

Fig. 11 is a side elevational view showing the power drive for effecting the feed of pieces from a hopper, and solenoid controlled means for stopping the feed when a piece has not properly reached a conveying position;

Fig. 11a is sectional view taken along the line 11a—11a of Fig. 13 and is a companion view to Fig. 11, and further includes a partial wiring diagram connecting two switches therein with other control mechanism used in the control of a machine or piece feeding operation;

Fig. 12 is an exploded perspective view of a clutch unit associated with the piece feeding mechanism;

Fig. 13 is a plan view showing the piece feeding mechanism and associated control mechanism;

Fig. 14 is a vertical sectional view, taken along the line 14—14 of Fig. 13, showing a part of the drive for the piece feed and stripper rollers;

Fig. 15 is a vertical sectional view with part in elevation showing the piece stripping and feeding elements, and more particularly showing mechanism for holding the trailing end of each piece against a ledge after feeding, also mechanism for moving the lower fold of a folded sheet away from the upper fold when it is desired to nest one or more pieces therein;

Fig. 16 is a view similar to Fig. 15, but shows means for the positioning of stops in the path of the pieces during the feeding thereof, and for the removal of said stops before the conveyor begins its forward movement;

Fig. 17 is a plan view of the machine, but with the parts shown generally limited to the mechanism shown in Figs. 15 and 16, and to similar mechanism associated with the envelope supporting position in the conveyor path;

Figs. 18 and 19 are side elevational views with parts in section which show the ram structure and clamp finger control elements, the ram moving rearward in Fig. 18 and forward in Fig. 19;

Fig. 20 is a plan view of the mechanism shown in Fig. 18;

Fig. 21 is a vertical cross sectional view taken along the line 21—21 of Fig. 20;

Figs. 22, 23, 23a, 24, 24a and 25 are vertical sectional views showing the mechanism employed in feeding envelopes and arranging same in proper position for receiving the insert material, with Figs. 23a and 24a including electrical solenoid controlled elements for the control of the envelope feed, the position of the elements of Figs. 23a and 24a agreeing with the position of the elements of 23 and 24 respectively.

Figure 27:
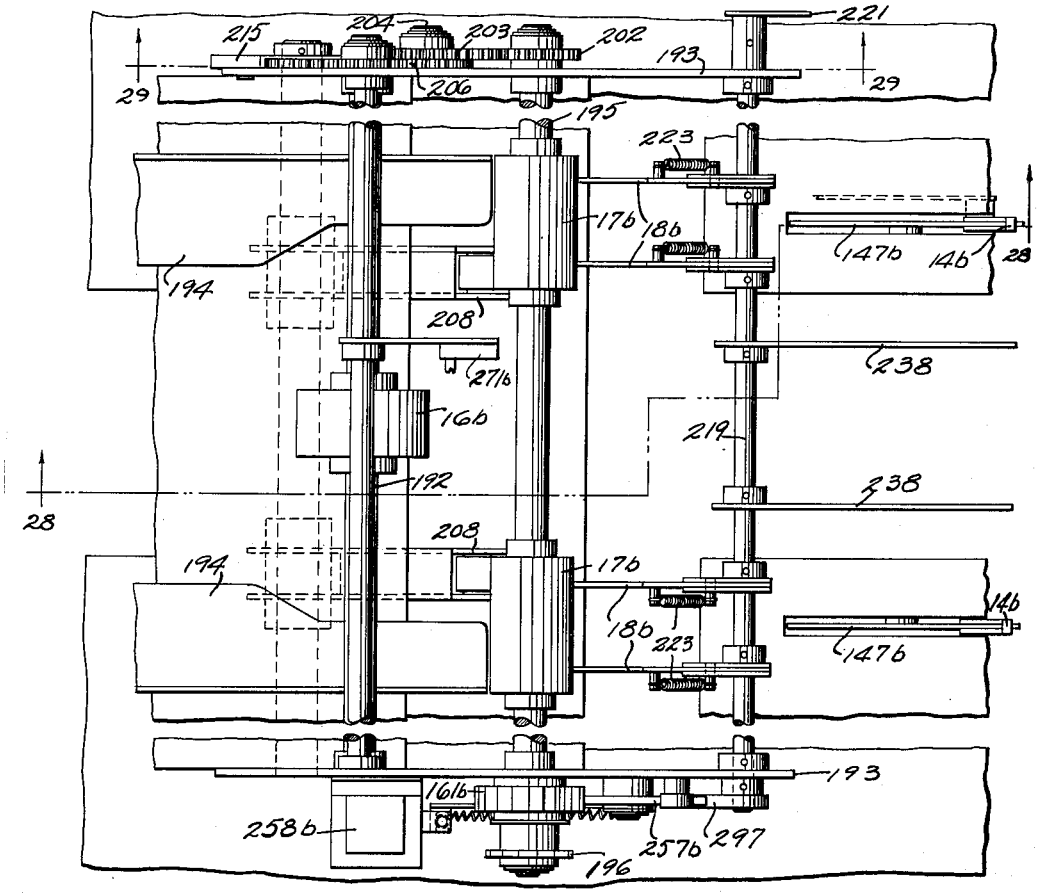
Figure 28:
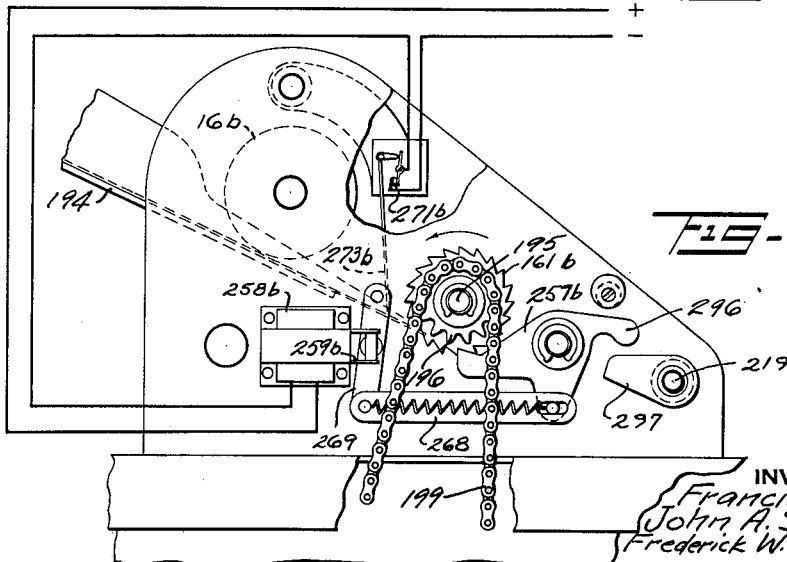

Fig. 26 is a side elevational view of the envelope feed structure with parts broken away and showing the operation wherein an envelope has been moved by the stripper roller to a switch operating position for effecting engagement of the ratchet pawl with the ratchet wheel to discontinue the drive of the envelope feed;

Fig. 27 is a plan view of the envelope feed mechanism;

Figs. 28 and 28a are associated vertical sectional views of the envelope feed mechanism, also the mechanism provided for holding the open flap of an envelope against a supporting member, mechanism for opening the mouth thereof, and mechanism for controlling the movement of stops in the path of the leading end of the envelope as it is fed from the hopper;

Fig. 29 is a vertical section taken along the line 29—29 of Fig. 27 and showing drive gearing for the envelope stripper and feed rollers;

Fig. 30 is a vertical section taken along the lines 30—30 of Fig. 8;

Fig. 31 is a vertical section taken through a stripper roller showing an over-riding clutch therefor;

Fig. 32 is a perspective detail view of a claw used in moving the lower fold away from the upper fold to present an open mouth within which assembled pieces of material are adapted to be inserted;

Fig. 33 is a vertical sectional view taken along the line 33—33 of Fig. 13 showing the stripper roller and adjustable mounting for an abrasive separator element associated therewith;

Fig. 34 is an exploded perspective view of a clutch unit associated with the main machine drive;

Fig. 35 is a side elevational view of the entire machine;

36 is a wiring diagram as associated with the drive and one feed unit of the machine;

Fig. 37 is a wiring diagram of the entire electro-mechanical control for automatically discontinuing the machine operation when pieces are not properly fed to the conveyor, and showing the timing control elements;

Figs. 38, 38a, 38b, 38c and 38d are diagrammatic views illustrating the method of assembling a group of three pieces of material and inserting said pieces in an envelope wherein:

Fig. 38 shows the deposit of the first piece on the conveyor in the order as fed from three different hoppers;

Fig. 38a shows the first step of movement of the conveyor wherein the first piece deposited is advanced one step in the intermittent conveyor movement, with each gripper holding the first piece deposited, and a second piece having been fed to the conveyor position from each hopper;

Fig. 38b shows the second step of conveyor movement with the two right hand grippers holding two pieces of material each and the third piece having been fed to the conveyor from each hopper;

Fig. 38c shows the third step of conveyor movement with the right hand gripper holding three pieces, the next gripper to the left holding two pieces and the next to the left holding one piece also a deposit of the fourth piece on the conveyor from each hopper; and Fig. 38d shows the final ram pick-up of the three assembled pieces and the insertion of same in the envelope while the two pieces held by the gripper to the left are moving into an assembled relation with the piece deposited.

Referring to the drawings, Figs. 1, 1a, 1b, 1c and 1d are shown for the purpose of illustrating diagrammatically the general broad operation of the envelope stuffing machine, and include some of the elements used in assembling the individual pieces and conveying same toward the envelope. Included among the elements is an intermittently movable conveyor 10 and a reciprocating ram 11, the ram being located at the discharge end of the conveyor. Gripper members 12 are spaced along the conveyor 10, and clamping fingers 13 are provided on the reciprocating ram 11. When referring to direction of motion of the conveyor or ram, forward motion shall be understood to mean motion from left to right as viewed from Fig. 1.

Pieces of material, such as letters, cards or other sheet material, and indicated at S and S1, are supported above the conveyor 10 in substantially the position indicated in Fig. 1 and are adapted to be fed from said positions to the positions of Fig. 1a during a first feeding step in a piece stripping operation. The said pieces then advance to conveyor pick-up position, as shown in Fig. 1b, during a feeding operation. Prior to the feeding operation, stop members 14 are projected into the path of the leading edge of each piece S and S1 for the purpose of positioning said pieces relative to the conveyor gripper members 12. Further, the trailing edge of each piece will normally rest on a ledge 15 at an elevation above the plane of the leading edge thereof.

An envelope "E" is also fed from a source of supply to the position indicated in Fig. 1c with its flap extended and mouth opened in the path of the ram and assembled pieces.

When the pieces S—S1 reach the conveyor, as at the positions shown in Fig. 1b, the conveyor, which moves intermittently, is advanced and the grippers 12 thereon open to engage the raised trailing edges of the pieces in the path thereof and move said pieces toward the envelope E. In the sequence of operation, which will be described in detail later, the piece S will be advanced into a nested relation with the piece S1 ahead of it, as best shown in Figs. 1b and 1c, or beneath the sheet S1 as indicated in Fig. 2. Following the piece assembling operation, the ram 11, which had moved from the position of Fig. 1, back to its starting position, will have again moved in a forwardly direction to the position of Fig. 1c. Having a speed of movement greater than the movement of the conveyor, the ram and clamp fingers 13 thereon, will overtake the moving assembled pieces S and S1, and carry said pieces beyond the grippers 12, as in Fig. 1d, to insert same in the open mouth of the envelope E.

Referring now to Figs. 3, 4, 5 and 6 of the drawings, the features disclosed in Figs. 1 through 1d are here illustrated in greater detail and will be so described.

In Fig. 3, the ram 11 is shown approaching the end of its forward stroke and effecting an envelope stuffing operation. The conveyor 10 is shown in an intermittent rest position, wherein it will be noted that one set of grippers 12 is in an intermediate position between piece supply hoppers H1 and H2. In each of said hoppers H1 and H2, Fig. 3, the first piece feeding operation is illustrated, wherein one piece from each hopper has been advanced by respective stripper rollers 16 and 16a to a point of engagement with associated feed rollers 17—17 and 17a—17a respectively. See also Fig. 13. Rotation of said feed rollers, 17—17 and 17a—17a will cause the pieces S and S1 to be fed therefrom and deposited in the path of the conveyor 10 with their leading edges engaging stops 14—14a and their trailing edges resting upon ledge portions 15 and 15a respectively. Presser fingers 18 and 18a are adapted to have their ends moved into contact with portions of each piece S—S1 which engage the ledge portions 15—15a to thereby retain the pieces in their correct pick-up positions when the conveyor 10 starts its forward motion.

Envelope feeding is accomplished in the same manner as piece feeding by means of a stripper roller 16b, which advances the envelope to the feed rollers 17b—17b, and said rollers 17b—17b feed the envelope into the path of the envelope stop 14b. The open flapped end of the envelope will engage a plate 21. Presser fingers 18b are associated with the flap portion of the envelope and are adapted to engage therewith to retain said flap against the plate 21, as shown in Fig. 3.

Also associated with the envelope are mouth opening claws 22 which are adapted to be rocked from the position indicated in Fig. 4, to the position of Fig. 3, to cause the claw portion thereof to pass within and open the mouth of the envelope.

Insertion of the assembled pieces within the envelope is effected when the ram 11 removes the said pieces from the conveyor and continues its forward motion beyond the position of Fig. 3. Ejection of the stuffed envelope from the ram, is effected through the momentum of the stuffed envelope when the ram begins its rearward stroke. When the ram then moves rearward, as indicated in Fig. 4, the stops 14—14a are withdrawn from engagement with the leading edges of the pieces S and S1, and the next cycle of intermittent conveyor feed is ready to start.

In Fig. 5, the conveyor 10 is shown advancing the piece S which had previously been in the intermediate position of Fig. 4, to a point where the leading edge thereof has entered the open fold of the folded sheet S1. During this portion of the machine cycle, the envelope, is in its insert receiving position with the mouth thereof opened in the direct path of the ram 11. Also, during this same portion of the machine cycle of operation, the piece S, which had last been deposited in a conveyor pick-up position, will be engaged by the grippers 12 and will be advanced to the intermediate position shown in Fig. 6, while the assembled pieces S and S1 are forwarded from the end of the conveyor to the envelope by the ram 11.

The grippers 12, which are opened in the manner best shown in Fig. 10, will pass over the trailing edge of the sheet S resting on the ledge 15 of Fig. 5, and in a like manner, the grippers which started from the intermediate position of Fig. 4 will be opened to pick up the edge of the sheet S1 resting on the ledge 15a. The gripper fingers 12 will be opened through the engagement of tail portions thereof with cams 23—23a and will close upon the trailing edges of the pieces S and S1 respectively after passing beyond the said cams 23—23a. As the gripper fingers 12 pass beyond the cam 23a, both sheets S and S1 are advanced by the conveyor 10 until withdrawn by the ram 11.

As shown in Fig. 5, the ram 11 is approaching the end of its rearward stroke while the piece S is being assembled with sheet S1. The ram, having a greater speed than the conveyor, will overtake the grippers 12 engaging the assembled pieces S and S1 on the conveyor, before said grippers move downwardly away from the horizontal driving path of the conveyor. The said assembled pieces, after being engaged by the clamp fingers 13, will be moved by the ram 11 toward and into the open mouthed envelope, as best shown in Figs. 3 and 6.

Referring now to the structure of the machine in detail, a supporting frame 24 is provided, as best shown in Figs. 7, 8, 8a and 15. The frame 24 generally comprises side plates 25—25 supported on a base 26, and has a surface plate 27 secured thereto. The side plates 25 are joined at their ends by members 28—28.

A motor support 29 is hinged at 31 to the left or rearward end of the supporting frame 24, and a motor 32 is secured to said support 29, as indicated in Figs. 7 and 8, said motor having a pulley 33 secured to a motor shaft 34.

A main drive shaft 35 is supported in bearings 36—36 between side plates 25—25, as in Fig. 8. A drive pulley 37, secured to one end of shaft 35, is connected with the motor pulley 33 by a belt 38. The pulley 37 rotates freely on the shaft 35 and has a gear 41 connected therewith, which gear is adapted to provide the driving means for an intermittent drive structure associated with the drive of the conveyor 10 and generally indicated at 42.

To effect control of the intermittent drive structure, the gear 41 meshes with a gear 43 mounted on a shaft 44, which shaft is supported in a bearing 45, carried by one side plate 25, and a bearing 46 carried by a sub-side plate structure 47.

A clutch, generally indicated at 48, is supported by the shaft 44 and provides a driving medium between the gear 43 and said shaft 44. Referring to Fig. 34, wherein said clutch is illustrated in an exploded perspective view, the structure comprises a clutch spring 51, which is wound and arranged when assembled, so as to normally grip a hub 52 on the gear 43 and a hub 53 which extends from a collar 54. The collar 54 is pinned to the shaft 44 by means of a pin 55. An outwardly bent end coil 56 of said clutch spring 51 is also adapted to engage a slot 57 in one end of a sleeve 58, which sleeve also has a ratchet wheel 59 formed as an integral part thereof. The sleeve 58 fits over the clutch spring 51.

A clutch stop 62 is fixed to a shaft 63 supported in bearings 60, in the manner best shown in Figs. 7 and 30. Manual means is provided for disengaging said clutch stop to start the machine operation, which means comprises a handle 64, also fixed to the shaft 63.

When the clutch stop 62 is engaged with the teeth of the ratchet wheel 59, the clutch spring end 56 is held stationary to effect an unwinding action of the clutch spring 51 and to free said spring from driving engagement with the hub portions 52 and 53 of the gear 43 and collar 54 respectively and consequently the shaft 44. But when said clutch stop 62 is disengaged from the teeth of the ratchet wheel 59, the clutch spring 51 will assume a normal clutching position with relation to the said hub portions 52 and 53, to thereby effect the drive of said shaft 44 by the drive gears 41 and 43.

The clutch shaft 44 controls the drive of the intermittent drive structure 42, Fig. 9, through a pinion 65 pinned to the clutch shaft 44, which pinion is adapted to drive a gear 66 through an intermediate pinion 67, the gear 66 being mounted on a shaft 68. The shaft 68 is supported within suitable bearings carried by the side walls 25—25 and has an intermittent gear actuator member 71 thereon, which comprises two oppositely disposed arms 72—72, each having a roller 73 mounted at the ends thereof. Combined with said actuator 71 is a shoe 74, both of which are secured to the gear 66 by rivets 75.

The elements which are adapted to be controlled by said actuator 71 comprise an intermittently driven head 76, which is freely mounted on the shaft 35 and is provided with cam slotted portions 77—77 and a curved end portion 78. Said curved end portion 78 is adapted to be engaged by the peripheral surface of the shoe 74 when the intermittent drive elements 71 and 76 are in their dwell positions. A gear segment 81 is secured to the head 76 by means of rivets 82, the toothed portion of which segment is adapted to be moved into mesh with the teeth of the gear 66 when a roller 73 on the actuator 71 has engaged a cam slot 77 and rotated the head 76 a predetermined distance. The gear segment 81, being fixed to the shaft 35, effects the drive of said shaft 35 and the drive of the conveyor 10. See also Fig. 30.

As shown in Figs. 8 and 8a the conveyor preferably comprises two driven belts 83—83, which are mounted on pulleys 84—84 pinned to the shaft 35 and pulleys 85—85 carried by a shaft 86. The shaft 86 is freely mounted in suitable bearings at the discharge end of the machine.

Four sets of grippers 12 are mounted on each belt 83 in evenly spaced relation in the manner indicated in Fig. 3, and each gripper comprises a lower jaw and support structure 87, Fig. 10, and an upper jaw 88. The lower jaw 87 is fixed to the belt 83 and the upper jaw is pivotally mounted on ears 91—91 projecting from said lower jaw, and is normally spring urged into a closed relation with said lower jaw. The upper jaw is adapted to be rocked to an open position by means of the engagement of a tail portion 92 thereon with a cam block 93, upon approaching a piece pick-up position, such as indicated in dot and dash lines, Fig. 10. The cam block 93 is supported by an arm 94 secured to the frame structure.

The reciprocating ram 11, previously referred to, is mounted between the conveyor belts 83—83 on two longitudinally positioned rods 95—95 in a manner best disclosed in Figs. 18–19 and 21. Said rods are supported within the end portions 28—28 of the machine frame, one end of which is indicated in Fig. 8 and the other in Fig. 8a. As best shown in Figs. 8, 20 and 21, the ram comprises an upper plate 96, which plate has a forwardly extending blade 97 and a downwardly bent tail portion 98. Said ram plate is supported on the surface of two angle plates 100—100, and said angle plates are secured to two side plates 101—101 in the manner shown in Fig. 21. Four rollers 102 are mounted between said plates 101—101 in pairs one above the other on shafts 103 supported within the said side plates.

The clamp finger structure 13 previously referred to, which is associated with the ram structure, is pivotally mounted on a pin 104 supported between the side plates 101—101. Said structure includes upwardly and forwardly extending clamp finger portions 105—105 and downwardly extending lugs 106—106, with a cam slot 107 in each of said lugs. Horizontally disposed links 108—108 have their forward ends joined by a pin 111, which pin also passes through the cam slots 107—107 of the lugs 106—106. The rearward ends of said links 108 are secured to a sleeve 112, which sleeve has a pin 113 fixed therein with its ends extending beyond the sides of the links and secured within the upper ends of a pair of rocker levers 114—114.

The rocker levers 114 are pivotally mounted at 115 on the outside of each side plate 101, and each lever has a roller 116 mounted at the end of the lowermost arm thereof in the manner indicated in Figs. 18–19. The links 108 and rocker arms 114 are provided for the purpose of rocking the clamp fingers 13 about their pivot pins 104 to effect the clamping engagement of the finger portions 105—105 with the assembled pieces of material and to consequently effect the removal of said assembled pieces from the conveyor for insertion into the envelope. When the pieces are inserted, release of the grip of the clamping fingers is effected. Control of the opening and closing of the clamp fingers is provided by cam blocks 118—118 and 117—117. Said cam blocks 118—117 are arranged at the forward and rearward positions relative to the movement of the ram respectively, as best indicated in Fig. 19.

As best shown in Figs. 3 and 4, reciprocating movement of the ram is provided by means of a connecting rod 119 having one end connected with a pin 122, projecting from one side plate 101, and the other end connected with a pin 123 projecting from a drive chain 124. The chain 124 is mounted on sprockets 125—125a, with the sprocket 125 fixed to the previously described clutch shaft 44 and the sprocket 125a fixed to the conveyor shaft 86.

The timing of the ram movement relative to the conveyor movement is such, that for each cycle of intermittent movement of the conveyor, a distance of one-fourth the peripheral length of the conveyor, the ram will reciprocate through one complete reciprocating stroke. When the assembled pieces S and S1 have reached the discharge end of the conveyor, the clamp fingers 13 will have engaged the trailing edges thereof and will have moved the assembled pieces beyond the grip of the conveyor gripper members 12, before said gripper members begin to move below the horizontal path of the conveyor, as best illustrated in Fig. 6.

Means is provided whereby the stop members 14—14, Figs. 16–17, are moved into the path of the leading edge of pieces of material S—S1 as each piece is fed from its respective hopper. As noted in Fig. 17, two stops are provided for each piece of material fed, as at 14—14 and 14a—14a. In referring to the mechanism for operating said stops, the description will be limited to a single stop but it will be understood that similar mechanism will be used to operate the other stop. Each stop member 14 is mounted on a T-shaped support 126, which support has a leg portion mounted on pins 127—127. The said pins 127—127 project from the side wall 25 of the frame structure and engage elongated slots 128—128 in said leg portion to permit vertical motion of the said T-shaped support, which motion is adapted to be effected by means of a bell crank 131.

The bell crank 131 is pivotally mounted on a stud 132 and has an arm 133 connected with the lower end of the leg of the support 126. An arm 134 of the bell crank is connected with a lever 136 by means of a link 135, the lever 136 being secured to a sleeve 137, mounted on a shaft 138 carried by the side plates 25—25. The lever 136 is also connected with another bell crank 139 by means of a link 141. The bell crank 139 is freely mounted on a shaft 142 and has a roller 143 mounted on one arm 144, the roller being urged against a cam 145 by means of a spring 149. The cam 145 is mounted on the cam shaft 68, previously referred to.

A T-shaped support 126a is associated with the pieces fed from the hopper H2, and is similar to the support 126. A bell crank 131a has an arm 133a connected with the T-shaped support 126a, and has an arm 134a linked to the lever 136 by means of a link 146. Wherever the parts associated with the T-shaped support 126a are similar to the parts associated with the T-shaped support 126, the reference numerals will be the same for each similar part but will have the exponent "a" added to distinguish same.

In effecting the operation of the stop members 14—14 and 14a—14a, the cam 145, which rotates once during each cycle of machine operation, will, through the mechanism described, effect vertical reciprocation of the T-shaped supports 126—126 and 126a—126a and the consequent movement of the stop members. Movement of the stop members 14—14 and 14a—14a in an upward direction into the path of the pieces of material fed will position said fed pieces relative to the conveyor feed, and movement in a downward direction will withdraw said stops from the path of the conveyor before the said conveyor advances the grippers 12 thereon to a piece engaging position. Horizontal slots 147—147 and 147a—147a are provided in the cross arm portions of the T-supports to permit adjustment of the stop members 14—14 and 14a—14a.

Referring now to the piece feeding means, said means comprises the previously described stripper roller 16 and feed rollers 17—17, shown in Figs. 11a and 13. The stripper roller 16 is fixed to a shaft 148, which shaft is supported between a pair of hopper supporting side plates 151—151 and said side plates are mounted on the feed or surface plate 27. Said roller 16 is provided with an over-riding clutch as best shown in Fig. 31, which comprises a spring 149 normally coiled around a bearing 150, fixed to the shaft 148, and around a bearing 150a fixed to the roller 16, but freely rotatable on the shaft 148. When the shaft 148 is driven, the spring 149 will tighten its coils around the bearings 150—150a to effect the drive of the stripper roller 16. When a sheet is stripped and is engaged by the faster rotating feed rollers 17—17, the coils of the spring will release their clutching grip on the bearings 150—150a to thereby permit the roller 16 to rotate freely.

A drive is provided for the separator feed roller shaft 148, as best shown in Figs. 11, 13 and 14, wherein a sprocket wheel 152 is mounted on the clutch shaft 44 and is connected with a sprocket wheel 153 by means of a chain 154. The sprocket wheel 153 is mounted upon a stud 155, which stud is carried by a bearing 156 projecting forwardly from one side plate 151. A gear 157 is fixed to the sprocket 153 and meshes with a gear 158. Said gear 158 is freely mounted on a shaft 159, which shaft is carried by the side plates 151—151, and the shaft is adapted to be driven through a clutch drive mechanism 160, Fig. 12.

In said clutch drive 160, a collar 159a, fixed to the shaft 159, and a hub 158a on the gear 158, are adapted to be placed in a driving or non-driving relation by means of a spring 160a, under the control of a ratchet wheel 161. The spring is adapted to have one end 160b engage a slot 160c in a portion of the ratchet wheel 161, and have the opposite end 160d engage a slot 161e in a portion of the collar 159a.

The shaft 159 extends beyond the plate 151 on one side of the machine and has a pinion 162 secured thereon, as best shown in Figs. 13 and 14. From said pinion 162 an intermediate drive is provided, which comprises a gear 163 meshing with pinion 162 and a pinion 164 joined with said gear 163, both being mounted on a stud 165, which stud is carried by the plate 151. Another pinion 166 meshes with the pinion 164 and is mounted on a shaft 167, which shaft is supported in suitable bearings carried by both side plates 151—151. The pinion 166 meshes with a gear 168, which gear is fixed to the shaft 148 which carries the stripper roller 16. Hence, the drive of the stripper roller 16 is effected from the clutch shaft 44, through sprocket wheel and chain drive 152, 153 and 154 respectively, then through gearing 157, 158 and clutch 160, then crossing over to the opposite side of the machine through shaft 159 to the gearing 162, 163, 164, 166 and 168, to the stripper feed roller shaft 148.

A separator element 171, preferably having an abrasive surface, is arranged in a cooperative position with relation to the separator feed roller 16 in a manner best shown in Figs. 11a and 33. The surface of said element 171 is also adapted to be adjusted relative to the surface of the roller 16 by the rotation of a screw 150. Said screw 150 is joined with a support 169 which support has the separator element 171 secured thereto and is pivotally mounted on a pin 169a. Rotation of the screw 150 by a knob 150a will rock the support 169.

A hopper feed plate 172 is supported between the side plates 151—151 in an angular position with relation to the feed table 27 and is provided with suitable side guides 173—173 to thereby provide for the support of the piece material arranged on edge in the manner best indicated in Fig. 15.

By means of the stripper roller 16 and cooperating abrasive element 171, the leading piece of the stacked piece material is withdrawn from the stack and moves along the feed plate 172 in the manner best indicated in Fig. 3, where the leading edge of the piece fed has been advanced to the feed rollers 17—17. The lower feed roller 17 is fixed to the shaft 159 and, as will be noted from the ratio of the gearing shown in Fig. 14, the shaft 148 will be rotated slower than the shaft 159, thereby effecting a faster feed of the rollers 17—17 than that of the stripper roller 16.

When the leading end of the piece of material is engaged between the feed rollers 17—17, it is fed therefrom and falls to the feed plate surface 27 in the path of the conveyor 10, with the leading edge thereof engaging the raised stops 14—14 and the trailing edge falling on the ledge 15. The ledge 15 is supported between the side plates 151—151 with the ledge portion positioned above the feed plate surface 27 and of the conveyor 10.

The presser fingers 18—18, previously referred to, are next rocked into engagement with the surface of the piece of material to yieldingly clamp the overlapping edge thereof against the ledge 15. Each finger 18 is pivotally mounted on a shaft 174, which shaft is supported within the side plates 151—151. The fingers 18—18 further have arms 175—175 extending at substantially right angles thereto, which arms are connected with levers 176—176 by means of springs 177. As best shown in Fig. 13, the levers 176—176 are fixed to said shaft 174 and the shaft 174 has a lever 170 fixed thereto, which lever is connected to a rocker element 178 by a link 179, as in Fig. 15. The rocker element 178 is fixed to a shaft 138, Fig. 17, and is connected with a bellcrank 182 by means of a lever 180 and link 183. The bellcrank 182 is pivotally mounted on the shaft 142 and has a roller 185 mounted at the end of one arm thereof. Said roller 185 is urged against a cam 186 by a spring 190, and the cam 186 is fixed to the cam shaft 68.

During a cycle of operation, the cam 186 will be rotated to effect rocking of the bellcrank 182, and through link 183, lever 180, shaft 138, rocker element 178, link 179, lever 170, levers 176—176, and the springs 177—177, a pulling force will be effected on the arms 175—175, which in turn urge the fingers 18—18 against the ledge 15.

The piece feed and other mechanism associated with second hopper H2, which is similar to the mechanism associated with the hopper H1 will have the same reference character as the equivalent part associated with the hopper H1, but with the exponent "a" included to distinguish same. For operation of the fingers 18a—18a, of the hopper H2, a link 179a is connected between the bellcrank 170a and the rocker element 178.

Referring to Fig. 1b, it will be noted that the piece of material fed from the hopper H2 has a double fold with the trailing edge portion therefor extending beyond the edge of the fold directly thereunder. The purpose of the extended edge is to provide means whereby the upper fold may be spaced above the lower fold to permit the piece of material from the hopper H1 to be nested therein, such as shown in Fig. 1b.

To be assured that the lower fold has moved away from the upper fold, claw means is provided which is adapted to enter between the upper and lower fold to positively move the lower fold away from the upper fold. As best shown in Figs. 15 and 17, said means comprises rocker arms 187—187, which arms are mounted upon studs 188—188, each arm 187 having a claw 189 formed at the upper end thereof. Said arms 187—187 are connected with the rocker element 178 by means of a link 191. During a cycle of operation therefore, rotation of the cam 186 will also effect the rocking of the arms 187, thus causing the claw portions 189—189 thereof to enter between the upper and lower folds of a folded sheet and draw the lower fold downward.

Envelopes are fed in the same manner as piece material and the mechanism provided includes the previously described stripper roller 16b and feed rollers 17b—17b. As best shown in Fig. 28, roller 16b is mounted on a shaft 192, which shaft is carried by side plates 193—193 of the hopper supporting structure. An envelope feed plate structure 194 is also provided for the support of the envelopes on edge in the manner best illustrated in Fig. 22. The upper feed roller 17b is mounted on a shaft 195, which shaft is supported in the side plates 193—193 and has a sprocket pinion 196 thereon, as in Figs. 26-27. The sprocket 196 is driven by a sprocket 198 and chain 199, as shown in Fig. 35.

The sprocket gear 198 is driven through a sprocket and chain drive 200—201 respectively, the sprocket 200 being mounted on the shaft 86 which supports the sprocket 125a, as best shown in Fig. 8a.

A drive having then been established to the feed roller shaft 195 to effect the drive of the upper feed rollers 17b, a further drive is taken from said shaft 195 to effect a reduction drive of the shaft 192 and the envelope stripper roller 16b thereon. As best shown in Fig. 29, said drive comprises a pinion 202 on the end of shaft 195 extending beyond the rear wall 193, which pinion meshes with a gear 203 on a stud 204. Also mounted on the stud 204 and forming a part of the gear 203 is a pinion 205, which pinion meshes with a gear 206 fixed to the stripper roller shaft 192. Through said latter gearing, the shaft 192 and stripper roller 16b are rotated at a slower speed than the feed roller 17b. An over-riding clutch of the type disclosed in Fig. 31 is also provided for the stripper roller 16b.

As best shown in Fig. 28, the lower feed roller 17b is mounted on a shaft 207, which shaft is carried by pivotal brackets 208. The brackets 208 are freely mounted on a shaft 209 and are normally urged in a counter-clockwise direction by means of a spring 211. Said spring 211 is coiled around the shaft 209 and has one end connected with a bracket 208 at 212 and the opposite end 213 anchored within an opening in the shaft. By rotatively adjusting the shaft 209 about its axis, the tension of the spring 211 may be increased or decreased. To maintain said tension, a ratchet wheel 214 is fixed to the shaft 209, and a pawl 215 is arranged to engage one tooth of the ratchet wheel to maintain the ratchet wheel in a set position. The pawl 215 is mounted on a pivot pin 216 and has one leg thereof normally urged toward the teeth of the ratchet wheel 214 by means of a spring 220.

The envelopes are normally stacked within the envelope hopper with their envelope flaps open. See Fig. 22. The lower edge of the envelope becomes the leading edge as each envelope is fed through the feed rollers 17b and comes to a rest position upon engaging stops 14b—14b. The open flap portion will rest upon the previously described shelf 21, the shelf being supported on the feed plate 27 above the path of ram travel.

Upon engagement of the envelope flap with the shelf 21, fingers 18b are moved into engagement with the upper surface of the flap to hold the envelope in the position established by the stops 14b—14b when said stops are later removed from the path of the leading edge of the envelope. The fingers 18b are pivotally mounted on a shaft 219, supported between the side plates 193—193. Movement is provided for said fingers 18b by means of a lever 221, fixed to the shaft 219, which lever is connected with a lever 224 by means of a link 225. The lever 224 is fixed to a shaft 226.

An arm 222 fixed to the shaft 219 is connected with the fingers 18b by means of a spring 223. Another lever 224a is fixed to the shaft 226 and is connected with a bellcrank 227 by means of a link 228. Said bellcrank is pivotally mounted on a shaft 229 and has a roller 231 at the end of one arm thereof, which roller is urged into contact with a cam 232 on the cam shaft 68. See Figs. 28–28a.

Therefore, when an envelope flap engages the shelf 21, the fingers 18b will be urged into a yielding engagement with the flap when the cam 232 rocks the bellcrank 227 about the pivot shaft 229 in a clockwise direction to effect rocking of levers 224a and shaft 226 through link 228 and the rocking of shaft 219 through rocking action of lever 224, link 225 and lever 221.

After the envelope E has moved to the last named position with the flap thereof engaging the shelf 21, the mouth of the envelope is adapted to be opened by means of the claw 22. Said claw 22 is mounted at the upper end of an arm 230, which arm is mounted on a stud 239. Said arm 230 is adapted to be rocked about the shaft 239 by means of a rocker lever 235, which lever has one arm 235a connected with an arm 230a forming a part of the arm 230, and has another arm 235b connected with a lever 236 on the shaft 226. When the shaft 226 is rocked in the manner previously described, the lever 236 will rock, and through a link 234 will effect the rocking of the lever 235 and the consequent rocking of the claw 22 into the envelope mouth, as in Fig. 28. The envelope mouth is thus opened in the path of the ram. Vertical adjustment is provided for the claw 22, as indicated by the screw and slot connection 237.

The stops 14b having been withdrawn from the path of the leading edge of the envelope as shown in Fig. 28, the final forward movement of the ram will effect insertion of the assembled pieces S and S1 within the envelope E, and said envelope will move therewith beyond the end of the feed plate 27. Normally, the mass and momentum of the stuffed envelope will be sufficient to cause the envelope to fly free of the ram when reverse movement of the ram is effected.

The envelope stops 14b—14b are raised and lowered under the control of a cam 130 on shaft 68, Fig. 28a, and associated mechanism, namely, a bellcrank 121 and roller 129, the bellcrank being connected with a bellcrank 131b by means of a link 120, as in Fig. 28. The bellcrank 131b is connected with the stop supporting member 126b.

A pair of fingers 238, mounted on the shaft 219, are adapted to be rocked downwardly into engagement with the upper surface of the envelope E when the envelope is fed toward the stops 14b—14b to thereby prevent the envelope from jumping over the stops. Said rocking of the fingers is accomplished through the rocking of the shaft 219 in the manner previously described.

Having described the mechanical structure, the electrical control features will now be described also their association with the previously described and other mechanical structure.

As best shown in Fig. 7, the pawl 62, which is associated with the ratchet wheel 57 of the clutch 48, has an arm 245 extending downwardly therefrom. Said arm 245 is connected with an armature 246 of a solenoid 247, which solenoid 247 is secured to one of the side walls 25 of the frame structure. Two detent notches 248—248a are provided at the lower edge of the arm 245 and cooperate with a detent pawl 249, which pawl is adapted to retain the clutch pawl 62 in either an engaged or disengaged position with relation to the ratchet wheel 57. The detent pawl 249 is pivotally mounted at 252 on the side plate 25 and is adapted to be yieldably maintained in its detent locking relation with the notches 248—248a by means of a spring 253.

As previously referred to, the pawl 62 is adapted to be disengaged from the ratchet wheel 57 through the manual operation of the handle 64. Energization of the motor 32 is also effected when said handle 64 is operated to disengage the pawl 62 from the ratchet wheel 57. The latter is accomplished through the connection of an arm 254 with a switch operating finger 255 of a switch 256.

As will later be described in detail, the solenoid 247 will be energized to effect a declutching operation and the breaking of the motor circuit when a sheet or envelope is not properly conditioned for a conveyor feed operation. The pawl 62 upon being rocked, as a result of energization of the solenoid 247, will engage with the ratchet wheel 57 and thereby discontinue operation of the clutch 48, and the rocking of the arm 254 will effect breaking of the main switch circuit to the motor drive and solenoid 247.

The clutch drive 160, Fig. 12, previously referred to, is associated with the drive of the lower feed roller 17 and stripper roller 16 and is adapted to have its associated ratchet wheel 161 engaged by a pawl 257 to effect clutch release through electrically controlled means and is adapted to be disengaged to effect a clutch drive through mechanically controlled means.

In the electrical control, Fig. 11, which is associated with piece feeding, an armature 259, extending from a solenoid 258, is connected with an arm 261 by means of a link 262, and said arm 261 is joined to the pawl 257 by means of a spring 272. Both the pawl 257 and arm 261 rotate about a pivot pin 263.

In the mechanical control, an arm 264, forming a part of the pawl 257, is connected with a lever 265 by means of a link 266. The lever 265 is fixed to the shaft 174, as best shown in Fig. 11.

The stripper roller 16 and lower feed roller 17 are connected to the drive means when the pawl 257 is disengaged from the ratchet wheel 161, at which time feeding of piece material is adapted to be effected, in the manner previously described.

Referring now to the electrical means of control of the pawl 257, a piece of material is shown in dot and dash lines, Fig. 11a, as having been moved by the stripper roller 16 to a position where the leading end thereof has engaged with a switch operating finger 273. Said switch finger 273 is pivotally mounted at 274 with the free end thereof suspended in the path of the piece of material and is adapted to be moved by said piece during the feeding thereof to the dot and dash line position to effect the closing of switch contacts 271. During said movement of the switch finger 273, a cam 275 fixed thereon will engage a switch contact arm 276 to effect the closing of an electrical circuit to the solenoid 258. Energization of the solenoid 258 will cause the armature 259 to rock the arm 261 to effect the throw of the pawl 257 into engagement with the ratchet wheel 161 and thereby discontinue the drive of the feed wheels 17—17. The feed of the piece of material will thus stop.

During the non-feed interval, the link 266, under control of the movement of the shaft 174, when rocked in a clockwise direction, will effect disengagement of pawl 257 from the teeth of the ratchet wheel 161 to thereby again effect the drive of the stripper roller 16 and lower feed roller 17. Hence, the piece of material, which had previously reached the feed rollers 17—17, when the feed stopped, will now be fed by the said rollers 17—17. When the piece of material is fed beyond the rollers 17—17, it will fall to the surface of the feed plate 27. In falling, the forward motion of the piece will be arrested when the leading edge engages the stops 14, and the trailing edge will fall on the ledge 15, in the manner previously described.

In the latter operations, the electrical control for stopping the piece feed through the operation of the switch 271 and solenoid 258, and the mechanical control for starting the feed through the mechanical release of the pawl 257, restricts piece feeding to the conveyor at such timed intervals as when the piece arresting stops 14—14 are in an arresting position and when the conveyor is in an intermittent rest position. Further, the timing is so related that the stops 14—14 will have been withdrawn and the conveyor will have advanced the piece of material by the time the subsequent piece of material has been stripped and advanced to the feed rollers 17—17.

The position of the parts in Figs. 11 and 11a coincide. Hence, with the arm 18 in its position of engagement with the ledge 15, the lever 265 and link 266 are shown in a position corresponding therewith. By the time the shaft 174 begins to rock clockwise, the solenoid 258 will have been energized through the closing of switch contacts 271 to effect the rocking of the pawl 257 into engagement with the ratchet wheel 161. Before the end of the clockwise motion of said lever 265, the end of the slotted portion 260 will have engaged a pin 270 on the arm 264 to rock the pawl out of engagement with the ratchet wheel 161.

In order to be certain that a piece has been fed from the feed rollers 17—17 during each cycle of machine operation, means is provided whereby the trailing edge of the piece fed will fall upon a switch operating finger 277 associated with switch contacts 278, as best shown in Fig. 11a. A cam 281 is connected with the switch operating end of the finger 277 in a manner similar to the cam 275 just described, and is adapted to cooperate with a switch arm 282 to rock said arm to a contact opening position to open the normally closed contacts 278.

As best shown in Fig. 11a, a partial wiring diagram is included which connects the switch contacts 278 in series with a pair of timer contacts 284 and solenoid 247. A timer switch arm 285 is adapted to be rocked about a pivot 286 by means of a cam 287, the cam 287 being fixed on cam shaft 68. During each machine cycle of operation, the cam 287 will move the contact on said arm into engagement with the companion contact, and, if the trailing edge of a piece of material is not lying on the ledge 15, the switch contacts 278 will remain closed, thereby completing a circuit to energize the main solenoid 247.

In Fig. 11a, the switch finger 277 is shown in a contact opening position as effected by the engagement of the trailing edge of the piece of material therewith while resting upon the ledge 15. When presser arms 18 move to the position shown in Fig. 11a, pressure is provided to hold the edge of the sheet against the switch finger 277. After the sheet is advanced by the conveyor grippers 12 beyond the ledge 15, the finger 277 will be spring urged to the position, indicated in dot and dash lines to effect closing of the contacts 278.

Duplicate switch closing elements, associated with the hopper H2, are identical with those described above and have been given the same reference numerals, but for the purpose of differentiating between them, an exponent "a" will be added.

When a nesting operation is to be effected between pieces of material S and S1, as in Figs. 1b and 5, means is provided to operate in conjunction with the claws 189 to discontinue the operation of the machine when either one of the two claws 189—189 fail to move the lower fold away from the upper fold. Said means comprises the provision of a switch 288 which has contacts 291 normally closed and which are adapted to be opened by a push button 292. As best shown in Fig. 32, each claw 189 has an opening 293 therein, through which the push button 292 is adapted to pass when there either is no folded sheet in position in the path of the conveyor 10 or when one or both claws fail to enter the lower fold. When a sheet is in proper position, and when both claws enter the fold properly, the push buttons 292—292 will be depressed by the claws 189—189 because they will be underneath the upper fold. That is, the claws 189—189 will bear upon the surface of the upper fold and push the fold against the push buttons 292—292 to thereby effect the breaking of the contacts 291—291 and produce an open circuit. Closing of timer contacts 284 during the particular cycle of machine operation will not be effective therefore in closing the circuit to the solenoid 247.

Having described the electrical control elements associated with the feed of the piece material, description of the control of envelope feeding will now be made. In the description concerning the electrical control, those parts which are similar to the parts previously described in connection with Figs. 11 and 11a, will carry the same reference numerals with the exponent "b" added to distinguish same.

Referring to Fig. 23, an envelope E is indicated as having been stripped from the stack shown in Fig. 22 and having advanced into the bite of the feed rollers 17b—17b, and further having advanced the switch operating finger 273b to a contact closing position.

The switch parts within the switch unit 271b include the same elements as shown at 274, 275 and 276, Fig. 11a. A solenoid 258b is connected with the switch unit 271b, as indicated by the partial wiring diagram in Figs. 23, 23a, and has an armature 259b which is connected with a pawl 257b by means of a link 268 and a lever 269, as shown in Figs. 23 and 26. The pawl 257b has an arm 296 projecting therefrom and into the path of a striker member 297. The striker member 297 is mounted on shaft 219, Figs. 17, 26–27, and is rocked by the cam 232, Figs. 17, 28–28a, previously described, during each cycle of machine operation. In rocking, the striker arm 297 will engage the arm 296, as indicated in Fig. 24, to rock the pawl 257b out of engagement with the ratchet wheel 161b and thus permit the drive of the upper feed roller 17b to feed the envelope to the position indicated in Fig. 25. After the envelope has passed through the rollers 17b—17b, the contact finger 273b will return under spring tension to the starting position of Fig. 22.

There is no provision for electrical control associated with the platform 21, such as there was with regard to the resting of the trailing edge of the sheet on the ledge 15 of either hopper H1 or H2. Further control is provided however, for the claw 22 and its associated switch which houses the contacts 291a. As best shown in Fig. 28, the claw 22 is shown as having stripped open the mouth of the envelope by entering into said mouth and having depressed the push button 292a to cause the contacts 291a therein to be moved to an open position.

A timer switch 279 and arm 280 is associated with the cam 287 and, as indicated in Fig. 37, said cam is adapted to close the switch contacts 279 180° later than the closing of the contacts 284. This permits time for the ejection of the prior stuffed envelope.

To understand the electrical control means more readily, two wiring diagrams are shown in Figs. 36 and 37. The diagram in Fig. 36 is in simplified form and includes the electrical wiring control for a single hopper, also connections to the motor 32 and main clutch control solenoid 247, which controls the operation of the main clutch 44.

In the motor circuit one terminal of the motor is connected directly to one side of the power supply line and the other motor terminal is connected to one of the switch contacts of the main switch 256. A second switch contact of said switch 256 is connected with the other side of the power supply.

The main clutch control solenoid 247, which also controls the opening of the switch contacts 256, has one terminal connected with one side of the power supply line and the other terminal connected to one switch contact of the normally closed contacts 278. The other contact of said contacts 278 is connected with one contact of the timer switch contacts 284, and the second contact 284 is connected with the other side of the power supply. Hence, the solenoid 247, ledge switch 285, and timer switch 284 are connected in series with the power line.

During any cycle of the machine operation, if a circuit is not completed to the solenoid 247 when the timer contacts 277 are closed, machine operation will continue uninterrupted. If however, contacts such as the normally closed contacts 278 have not been opened by the engagement of the edge of the sheet with the ledge 15, as previously described, the circuit to the solenoid 247 will be completed when the timer contacts 284 are closed. The solenoid 247 will thus be energized and cause the pawl 62 to engage the ratchet wheel 57, whereby the clutch grip will be released and the machine operation discontinued. The energized solenoid 247 will also cause the switch 256 to be opened to discontinue the motor drive.

As further shown in Fig. 36 in dot and dash lines, a pair of claw operated contacts 291—291 are connected in parallel, one with the other, and in parallel with the contacts 278. Hence, if any of the normally closed contacts 291—291 remain closed, because a claw 189 did not engage the lower fold, the circuit to the solenoid 247 will be completed when the timer switch 284 is closed.

In a like manner, if any of the contacts of any of the hopper switches connected in series with the timer switches 284 and 279, remain closed during a machine cycle of operation, a circuit will be completed to the solenoid 247 at the moment of closing of either of the timer contacts 277 or 279 to thereby discontinue the machine operation. In Fig. 37, a complete wiring circuit is disclosed, which also includes the units of mechanical structure associated with the electrical control elements.

In Figs. 38 through 38d the method of assembling a group of pieces of material is shown to particularly illustrate how a plurality of pieces are first deposited in the path of a conveyor with their trailing edges raised as in Fig. 38, and how each piece is conveyed a distance determined by the intermittent stroke of the conveyor, while another group of pieces are deposited in the same positions occupied by the first named pieces, as in Fig. 38a. Further movement of the conveyor feed will effect the gripping of the last deposited piece, and, where there had previously been a piece in the gripper, there are now two pieces, as noted at 12b and 12c in Fig. 38b. Also during the last movement of the conveyor, a further group of pieces was deposited in a conveying position. Then, when the third step of conveyor movement is effected the gripper 12c will add a third piece to the two therein as in Fig. 38c, while the gripper 12d will now have two pieces, and the gripper 12c one piece.

With the gripper 12c now at the discharge end of the conveyor, the assembly therein will next be removed therefrom by the clamp fingers 13 of the ram 11 and will be inserted in the envelope E, as in Fig. 38d.

In said Figs. 38 through 38d it is also clearly shown how, in moving from one position to another, the piece or pieces supported within a gripper 12 will move beneath the last piece deposited in the path thereof and will finally become assembled therewith. Fig. 38d best illustrates the latter condition.

The controlling stops, presser fingers and all other associated mechanism were purposely omitted from Figs. 38–38d to permit the principle of operation to be clearly illustrated.

Referring to the operation in detail, it will be noted that the first complete assembly of three pieces S1, S2 and S3 is not effected until the fourth step in the operations shown, as in Fig. 38c. For instance, the piece S1 reaches the conveyor in the piece feeding operation shown in Fig. 38. During the first cycle of conveyor movement the piece S1 is advanced by the gripper 12c to the position of Fig. 38a, while the piece S2 is fed to the conveyor at a position ahead of the piece S1. During the second cycle of conveyor movement the piece S2 is picked up by the gripper 12c and is assembled with S1 as in Fig. 38b, while the piece S3 is fed to the conveyor at a position ahead of the combined pieces S1 and S2. Then during the third cycle of operation, the gripper 12c advances to pick up the piece S3 thereby combining same with the pieces S1 and S2 upon reaching the position of Fig. 38c.

The process of movement of the second group of three pieces S4, S5 and S6 can be followed in the same manner as the previous group, S4 first appearing in the second cycle of operation, Fig. 38a, and S5 and S6 appearing in each of the next two cycles.

The third group of three pieces S7, S8 and S9 also appears, with the piece S9 indicated in a position before it is fed to the conveyor.

The pieces indicated at S, Sa and Sb, will not combine to form a three piece assembly before discharge and will normally be withdrawn by hand either before they reach the envelope or will be removed from the envelopes if allowed to advance to an inserting position.

Although the total number of pieces assembled by the arrangement shown in Figs. 38 through 38d is three, it is obvious that the conveyor belt can be extended to receive additional pieces if desired.

Having described the invention what is claimed is:

1. A machine for assembling pieces including non-folded pieces of material prior to insertion in envelopes and comprising, a conveyor intermittently movable along a horizontal plane in one direction, material supply hoppers positioned over the conveyor, stop elements movable into and out of the path of conveyor feed in timed relation to the intermittent movement of the conveyor, means to strip and feed single pieces of material from each hopper and deposit same in the path of the conveyor feed, a ledge associated with and supported in the path of the trailing end of each piece of material fed from the hopper, each ledge providing means to position the trailing edge of a piece of material above the path of the conveyor feed while the forward edge of the material rests against the stop elements, material advancing means movable with the conveyor into engagement with the raised trailing edges of respective pieces of material to advance said pieces, the conveyor and material movement being controlled to provide for the advancement of the material from a material deposit position to a position intermediate two adjacent material deposit positions, whereby a piece of material is removed from the ledge during initial conveyor movement of one cycle of operation and moves to an assembled position beneath the piece at the next deposit position during the following cycle of conveyor movement.

2. A machine as in claim 1, wherein a clutch controlled drive is associated with each means to strip and feed a single piece of material from each hopper and includes, a solenoid controlled clutch stop, and a switch controlled circuit to energize the solenoid including a switch having normally closed contacts and associated with the ledge, and having a contact operating element positioned over the ledge and in the path of a piece of material which is fed thereto, whereby upon engagement of the trailing edge of the sheet with said ledge the switch contacts are opened to prevent energization of the solenoid and consequent operation of the clutch stops during the operation of the conveyor cycle.

3. A machine as in claim 1, wherein the material advancing means comprises, gripper members having an upper and a lower jaw with one jaw movable relative to the other and normally urged to a closed position, and means cooperating with the movable jaw to effect movement thereof to an open position when the gripper approaches a piece of deposited material.

4. A machine for assembling pieces of material prior to insertion in envelopes and comprising, a conveyor intermittently movable along a horizontal plane, material supply hoppers positioned over the conveyor, stop elements movable into and out of the path of conveyor feed in timed relation to the intermittent movement of the conveyor, means to strip and feed single pieces of material from each hopper and deposit same in the path of the conveyor feed, a ledge associated with and supported in the path of the trailing end of each piece of material fed from the hopper, each ledge providing means to position the trailing edge of a piece of material above the path of the conveyor feed while the forward edge of the material rests against the stop elements, material advancing means movable with the conveyor into engagement with the raised trailing edges of respective pieces of material to advance said pieces, the conveyor and material movement being controlled to provide for the advancement of the material from a material deposit position to a position intermediate two adjacent material deposit positions, whereby a piece of material is removed from the ledge during initial conveyor movement of one cycle of operation and moves to an assembled position beneath the piece at the next deposit position during the following cycle of conveyor movement, and yieldable presser members supported with their presser portions positioned beyond the path of each piece of material when fed to the conveyor, and means to move said presser members into engagement with the trailing edges of each piece of material after the engagement thereof with the ledge.

5. In an envelope stuffing machine, a conveyor including an intermittent drive therefor, material supply hoppers spaced apart above the conveyor and having pieces of material stacked therein, stop elements, means to move said stop elements into and out of the path of the conveyor feed in timed relation to each intermittent motion of the conveyor, material stripping and feeding devices positioned relative to the leading piece of material in the supply hoppers to strip and feed the leading piece from each hopper to the path of the conveyor feed and into engagement with the stop elements during each cycle of intermittent conveyor drive, means for supporting the trailing edge of each piece above the path of the conveyor feed when fed thereto, gripper members on the conveyor, means to effect opening of the gripper members during conveyor movement whereby the gripper members are moved into engaging relation with the trailing edges of individual pieces of material deposited in the path of the conveyor feed, whereby the pieces are moved a predetermined distance intermediate the hopper feed positions while additional pieces are fed from the hoppers to the conveyor, and whereby during the following intermittent conveyor movement the piece engaged by the gripper will be moved beneath the last named additional piece deposited on the conveyor while the grippers open to engage the additional piece, a ram located at the discharge end of the conveyor, a reciprocating drive for said ram, means to support an envelope with its mouth opened in the path of the ram, and means projecting from the ram surface to engage and remove the assembled pieces of material from the discharge end of the conveyor and advance said pieces into the envelope.

6. In an envelope stuffing machine, a conveyor including an intermittent drive therefor, material supply hoppers spaced apart above the conveyor, stop elements, means to move said stop elements into and out of the path of the conveyor feed in timed relation to each intermittent motion of the conveyor, material stripping and feeding devices supported within the material supply hoppers and cooperating with the material in said hoppers to strip and feed one piece of material from each hopper to the path of the conveyor feed and into engagement with the stop elements when in the path thereof during each cycle of machine operation, means for supporting the trailing edge of each piece above the path of the conveyor feed, gripper members on the conveyor having jaws normally urged to a gripping position, gripper operating devices operable during conveyor movement to cause the gripper jaws to open while moving toward and into engagement with the trailing edges of the pieces of material deposited in the path of the conveyor feed, said jaws closing upon engaging the piece to retain the piece in a fixed position during conveyor movement, each piece thus being adapted to be removed from a position beneath the hopper to a position between adjacent hoppers during one movement of the conveyor and being further adapted to pass beneath and be assembled with the piece next fed to the conveyor, a ram located at the discharge end of the conveyor, a reciprocating drive for said ram operable at a speed greater than that of the conveyor, means to support an envelope with its mouth opened in the path of the ram, clamp elements on the ram, and means to effect movement of the clamp elements while the ram moves in the direction of conveyor movement to thereby engage and remove the assembled pieces of material from the discharge end of the conveyor and advance said pieces into the envelope.

7. In an envelope stuffing machine, a conveyor including an intermittent drive therefor, material supply hoppers spaced apart above the conveyor, stop elements, timing elements including cam controlled means to move said stop elements into and out of the path of the conveyor feed in timed relation to each intermittent motion of the conveyor, material stripping and feeding devices supported within the material supply hoppers and cooperating with the material in said hoppers to strip and feed one piece of material from each hopper to the path of the conveyor feed and into engagement with the stop elements when in the path thereof during each cycle of machine operation, means for supporting the trailing edge of each piece above the path of the conveyor feed, gripper members on the conveyor having jaws normally urged to a gripping position, gripper operating devices operable during conveyor movement to cause the gripper jaws to open while moving toward and into engagement with the trailing edges of the pieces of material deposited in the path of the conveyor feed, said jaws closing upon engaging the piece to retain the piece in a fixed position during conveyor movement, each piece thus being adapted to be removed from a position beneath the hopper to a position between adjacent hoppers during one movement of the conveyor and being further adapted to pass beneath and be assembled with the piece next fed to the conveyor, a ram located at the discharge end of the conveyor, a drive including means timed to effect reciprocation of said ram at a speed greater than that of the conveyor and effect pickup of the assembled pieces while the conveyor is in motion, means to support an envelope with its mouth opened in the path of the ram, clamp elements on the ram, and cam controlled means to effect movement of the clamp elements while the ram moves in the direction of conveyor movement to thereby engage and remove the assembled pieces of material from the discharge end of the conveyor and advance said pieces into the envelope.

8. In an envelope stuffing machine, a horizontal feed plate, a conveyor including an intermittent drive therefor, material supply hoppers spaced apart above the conveyor and feed plate, an envelope supply hopper having open flapped envelopes supported therein and aligned with the material supply hoppers, stop elements associated with each hopper of said conveyor, means to move said stop elements into and out of the plane of and in timed relation to the conveyor feed, material and envelope stripping and feeding devices supported within each of the material and envelope supply hoppers respectively to strip and feed one piece of material and an envelope from each hopper respectively to the surface of the feed plate and into engagement with respective stop elements during a machine cycle of operation, means for supporting the trailing edge of each piece of material above the plane of the conveyor feed when the piece reaches the feed plate, means for supporting the envelope with its mouth opened in the plane of the pieces of material, gripper members on the conveyor having jaws normally urged to a closed position, gripper operating devices operable during conveyor movement to cause the gripper members to open while moving into gripping relation with the trailing edges of the pieces of fed material, whereby said pieces are securely retained in position while the conveyor moves during each intermittent step thereof, the said conveyor having a stroke of movement starting from a position back of the first hopper and terminating between the first and second hopper, whereby during conveyor operation a piece positioned at the last named position is adapted to pass beneath and be assembled with the piece last fed to the feed plate from the second hopper, a ram located at the discharge end of the conveyor and having horizontal movement in alignment with the mouth of the envelope, a reciprocating drive for said ram, and means to effect transfer of the assembled pieces of material from the conveyor to the ram and move said pieces into the envelope.

9. In an envelope stuffing machine, an intermittently movable conveyor having material engaging members thereon, material supply means including feeding devices for stripping individual pieces of material and depositing each piece with the trailing ends thereof raised and in the path of the material engaging members on the conveyor, a support for said trailing ends, presser elements engaging the trailing ends of the fed pieces and cooperating with the support to hold the pieces in a pick-up position, said conveyor being movable to cause the leading edge of one piece of material to pass beneath the raised trailing edge of another piece to become assembled therewith, a reciprocating ram located at the discharge end of the conveyor, means associated with the ram to remove the assembled pieces from the conveyor, and an envelope supply associated with the ram including devices for depositing an envelope with its flap and mouth open in the path of the ram, the ram providing a shuttle between the conveyor and envelope to transfer the material from the conveyor to the envelope.

10. In an envelope stuffing machine, a horizontally movable member having piece material assembled thereon, a support positioned above the path of the movable member, stop elements, a hopper positioned above the movable member and having a supply of enevlopes therein with flaps extended in an open position, means to strip and feed an envelope from said hopper and deposit same in a position wherein the flap will rest upon the support and the leading edge will engage the stop elements, yieldable presser elements movable into engagement with the envelope flap to hold the flap against the support and retain the envelope in an aligned position with the horizontally movable member, and claw members movable into the mouth of the envelope to separate the front wall from the back wall of the envelope, whereby the mouth is opened in the path of the horizontally movable member to permit the pieces assembled thereon to be inserted in the envelope by the horizontally movable member.

11. In an envelope stuffing machine, a horizontally movable member having piece material assembled thereon, a support positioned above the path of the movable member, stop elements, a hopper positioned above the movable member and having a supply of envelopes therein with flaps extended in an open position, means to strip and feed an envelope from said hopper and deposit same in a position wherein the flap will rest upon the support and the leading edge will engage the stop elements, finers movable over the top of each envelope upon approaching a deposit position to effect holding the envelope within the limits of the stop elements, yieldable presser elements movable into engagement with the envelope flap to hold the flap against the support and retain the envelope in an aligned position with the horizontally movable member, and claw members movable into the mouth of the envelope to separate the front wall from the back wall of the envelope, whereby the mouth is opened in the path of the horizontally movable member to permit the assembly of pieces thereon to be inserted in the envelope by the horizontally movable member.

12. A machine for assembling pieces including non-folded pieces of sheet material prior to insertion in envelopes and comprising, a conveyor intermittently movable in one direction along a horizontal plane, material supply hoppers positioned over the conveyor, stop elements movable into and out of the path of conveyor feed in timed relation to the intermittent movement of the conveyor, driven feed rollers at each hopper to advance single pieces of material from a hopper and deposit same in the path of the conveyor feed, a ledge horizontally positioned between the feed rollers and conveyor in the path of the trailing edge of each piece of material fed from the hopper to thereby support the trailing edge of a piece of material above the path of the conveyor feed while the forward edge of the material rests against the stop elements, material advancing means movable with the conveyor and elevated to the height of the raised trailing edges of respective pieces of material to engage and advance said pieces while the pieces are maintained in substantially their raised trailing edge positions of initial deposit, means controlling the conveyor and material movement to advance the material from the material deposit position to a position intermediate two adjacent material deposit positions, whereby after a piece of material is removed from the ledge to an intermediate position during initial conveyor movement of one cycle of operation, it is later moved to an assembled position beneath the piece at the next deposit position during the following cycle of conveyor movement.

References Cited in the file of this patent

UNITED STATES PATENTS

| | | |
|---|---|---|
| 1,234,897 | Halvorsen | July 31, 1917 |
| 1,754,831 | Marsh | Apr. 15, 1930 |
| 1,803,049 | Bouton | Apr. 28, 1931 |
| 1,861,406 | Cook | May 31, 1932 |
| 2,258,479 | Barkley | Oct. 7, 1941 |
| 2,363,357 | Post | Nov. 21, 1944 |
| 2,384,506 | Thompson | Sept. 11, 1945 |
| 2,427,839 | Davidson | Sept. 23, 1947 |
| 2,456,449 | Rouan et al. | Dec. 14, 1948 |